United States Patent
Sugie

(10) Patent No.: US 11,949,357 B2
(45) Date of Patent: Apr. 2, 2024

(54) CONTROL CIRCUIT OF THREE-PHASE DC MOTOR

(71) Applicant: ROHM Co., LTD., Kyoto (JP)

(72) Inventor: Hisashi Sugie, Kyoto (JP)

(73) Assignee: ROHM Co., LTD., Kyoto (JP)

(*) Notice: Subject to any disclaimer, the term of this patent is extended or adjusted under 35 U.S.C. 154(b) by 31 days.

(21) Appl. No.: 17/683,611

(22) Filed: Mar. 1, 2022

(65) Prior Publication Data

US 2022/0286075 A1    Sep. 8, 2022

(30) Foreign Application Priority Data

Mar. 3, 2021  (JP) ................. 2021-033886

(51) Int. Cl.
| | | |
|---|---|---|
| H02P 1/00 | (2006.01) | |
| H02M 7/5387 | (2007.01) | |
| H02P 6/12 | (2006.01) | |
| H02P 27/06 | (2006.01) | |
| H02P 29/024 | (2016.01) | |

(52) U.S. Cl.
CPC ........ *H02P 27/06* (2013.01); *H02M 7/53875* (2013.01); *H02P 6/12* (2013.01); *H02P 29/024* (2013.01)

(58) Field of Classification Search
CPC .......... H02P 27/06; H02P 6/12; H02P 29/024; H02P 6/085; H02M 7/53875; H02M 7/53871; H02M 1/0009
See application file for complete search history.

(56) References Cited

U.S. PATENT DOCUMENTS

2008/0265829 A1*  10/2008  Hayashi .............. H02P 21/26
                                                       318/801
2020/0287492 A1*  9/2020   Sega ..................... H02P 6/185

FOREIGN PATENT DOCUMENTS

JP          2019009875          1/2019

* cited by examiner

*Primary Examiner* — Karen Masih
(74) *Attorney, Agent, or Firm* — CHIP LAW GROUP

(57) ABSTRACT

Disclosed herein is a control circuit of a three-phase DC motor used along with an external resistance and a three-phase inverter. The control circuit includes a current detection circuit that generates a first current detection value indicating an amount of current of a first current flowing through a first phase of the three-phase inverter. The current detection circuit can generate the first current detection value, based on a voltage drop of a resistance component of a wire existing on a path of the first current, the wire being formed from a material containing copper, or based on a voltage drop of a first resistance that is an on-resistance of an arm of the first phase, and can use, as a standard, a current detection value based on a voltage drop of the external resistance to calibrate the first current detection value based on the voltage drop of the first resistance.

14 Claims, 13 Drawing Sheets

PRIOR ART

PRIOR ART

PdCu WIRE RESISTANCE VALUE – ENERGIZING CURRENT CHARACTERISTICS

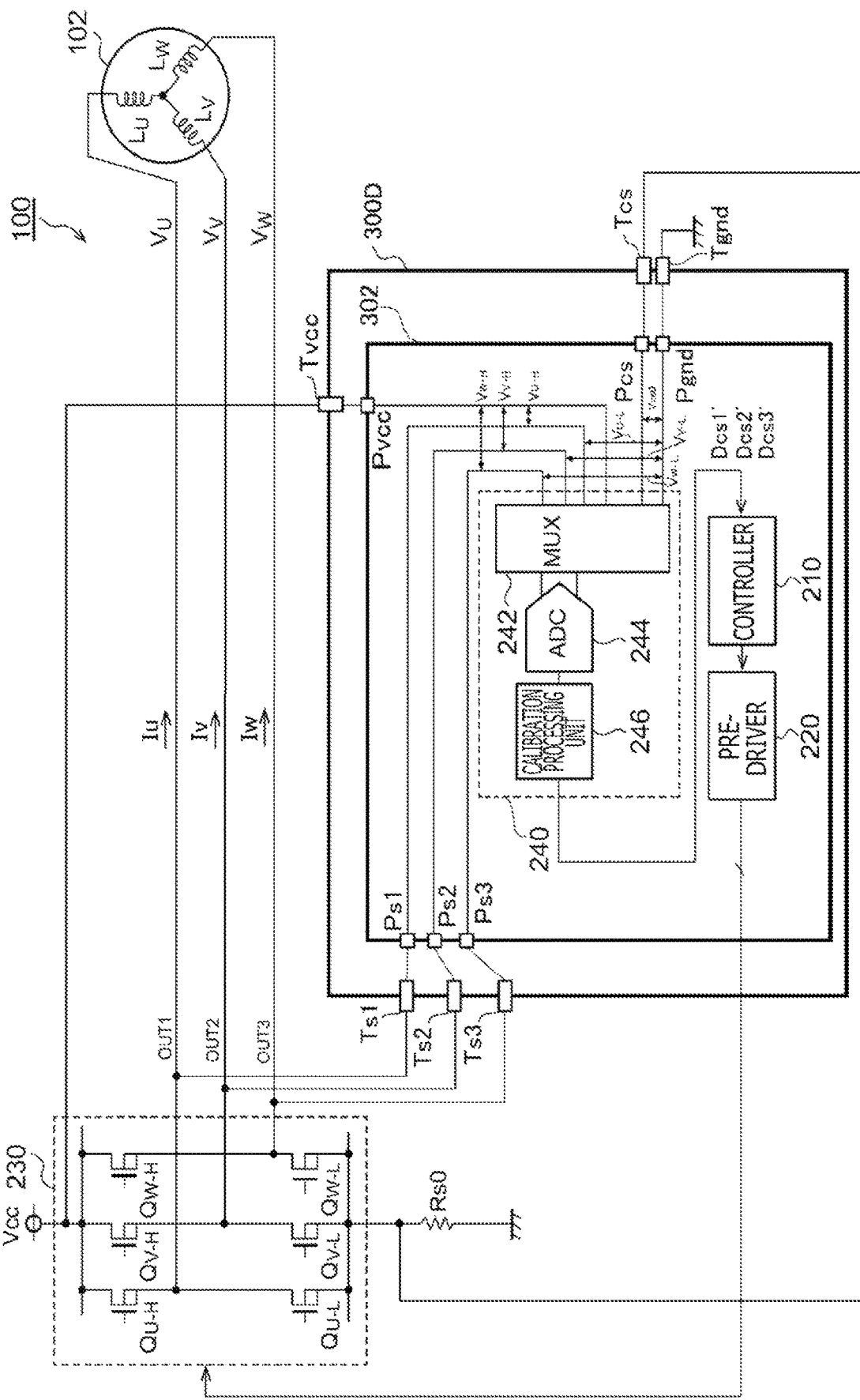

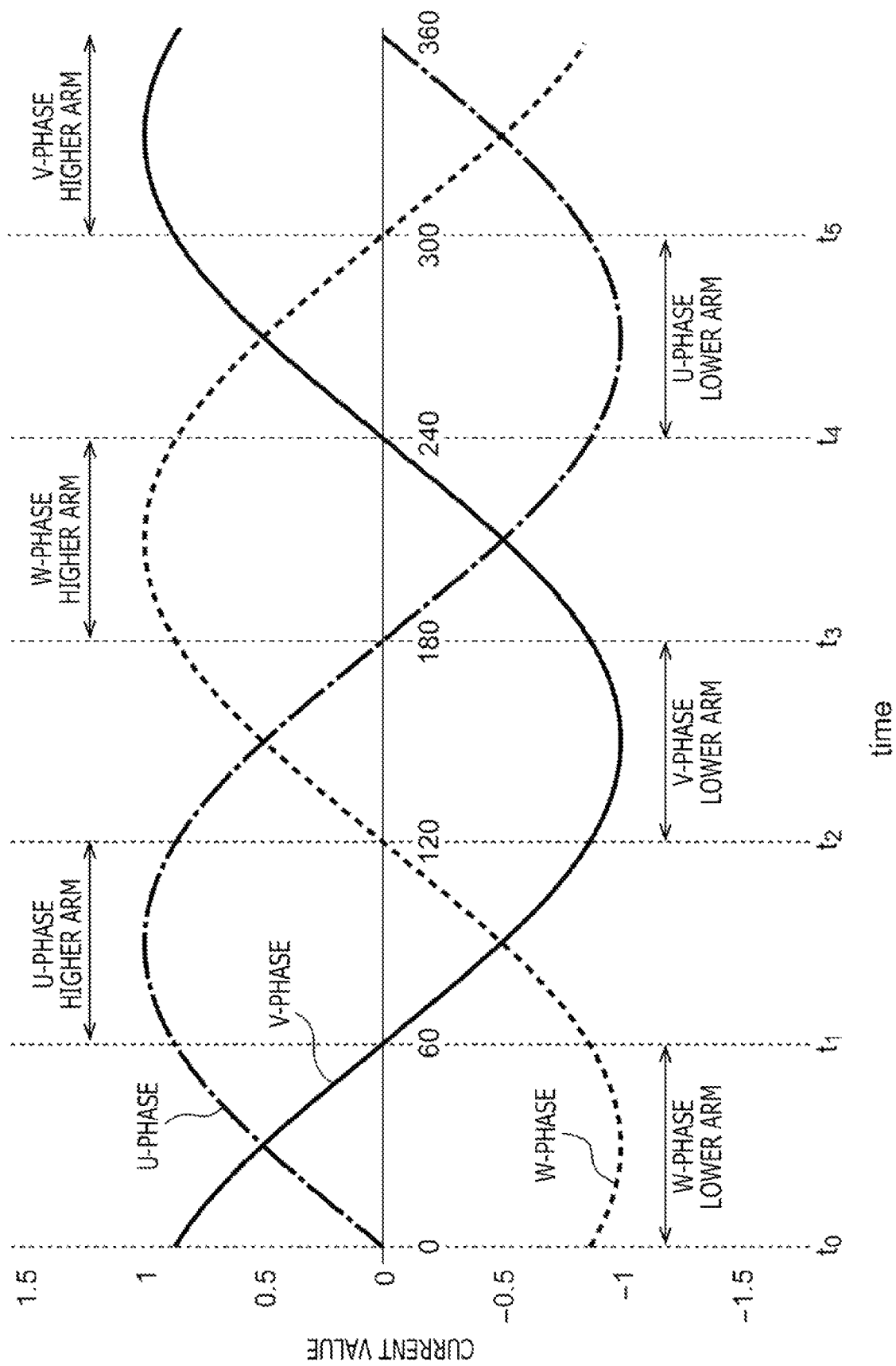

CONTROL CIRCUIT OF THREE-PHASE DC MOTOR

CROSS REFERENCE TO RELATED APPLICATIONS

This application claims priority benefit of Japanese Patent Application No. JP 2021-033886 filed in the Japan Patent Office on Mar. 3, 2021. Each of the above-referenced applications is hereby incorporated herein by reference in its entirety.

BACKGROUND

The present disclosure relates to a control circuit of a three-phase direct current (DC) motor.

DESCRIPTION OF THE RELATED ART

Square wave drive, sine wave drive, vector control, and the like are known as examples of a drive system of a motor. The current of each phase of the motor needs to be accurately detected to accurately control the motor in the drive system.

FIGS. 1 and 2 are explanatory diagrams of current detection of the related art. FIG. 1 illustrates a detection system called a one-shunt system, and one current detection resistance Rs is inserted into a lower side of a three-phase inverter (bridge circuit) 6. A current detection circuit 4 detects the current received by the bridge circuit 6 from a three-phase DC motor 2 on the basis of a voltage drop of one current detection resistance Rs. The timing of detecting the currents of the U-phase, the V-phase, and the W-phase is restricted in the one-shunt system.

FIG. 2 illustrates a detection system called a three-shunt system, and current detection resistances $Rs_U$ to $Rs_W$ are inserted into lower sides of legs of the U-phase, the V-phase, and the W-phase of a three-phase inverter (bridge circuit). The current detection circuit 4 detects the current received by the bridge circuit 6 from the motor 2 on the basis of voltage drops of three current detection resistances $Rs_U$ to $Rs_W$. Although the currents of three phases can be detected at the same time in the three-shunt system, the cost is high because three external resistances are necessary.

An example of related art includes Japanese Patent Laid-Open No. 2019-9875.

SUMMARY

The present disclosure has been made in view of the above circumstances, and it is desirable to provide a control circuit of a motor that can accurately detect a current flowing through the motor at low cost.

An aspect of the present disclosure relates to a control circuit of a three-phase DC motor used along with an external resistance and a three-phase inverter. The control circuit includes a current detection circuit that generates a first current detection value indicating an amount of current of a first current flowing through a first phase of the three-phase inverter. The external resistance is an external part provided on a path where the first current is able to flow, and the current detection circuit is able to generate the first current detection value on the basis of a voltage drop of a resistance component of a wire existing on the path of the first current, the wire being formed from a material containing copper, or on the basis of a voltage drop of a first resistance that is an on-resistance of an arm of the first phase, and is able to use, as a standard, a current detection value based on a voltage drop of the external resistance to calibrate the first current detection value based on the voltage drop of the first resistance.

Note that freely-selected combinations of the constituent elements as well as constituent elements and expressions obtained by exchanging the constituent elements and the expressions of the present disclosure among methods, apparatuses, or systems are also effective as aspects of the present disclosure.

According to the aspect of the present disclosure, the current flowing through the motor can be accurately detected at low cost.

BRIEF DESCRIPTION OF THE DRAWINGS

FIG. 12 is a circuit diagram of a control circuit according to Example 6;
and
FIG. 13 is a waveform diagram describing a calibration process in the control circuit of FIG. 12.

DETAILED DESCRIPTION OF THE PREFERRED EMBODIMENTS

Overview of Embodiments

Figure 1:
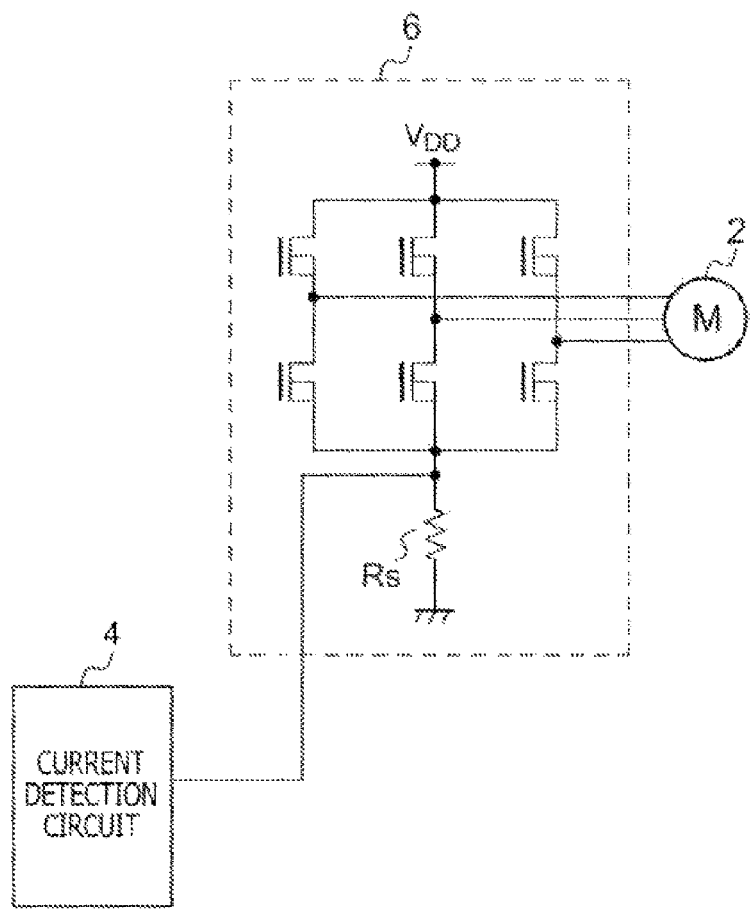
FIG. 1 is an explanatory diagram of current detection of the related art.
Figure 2:
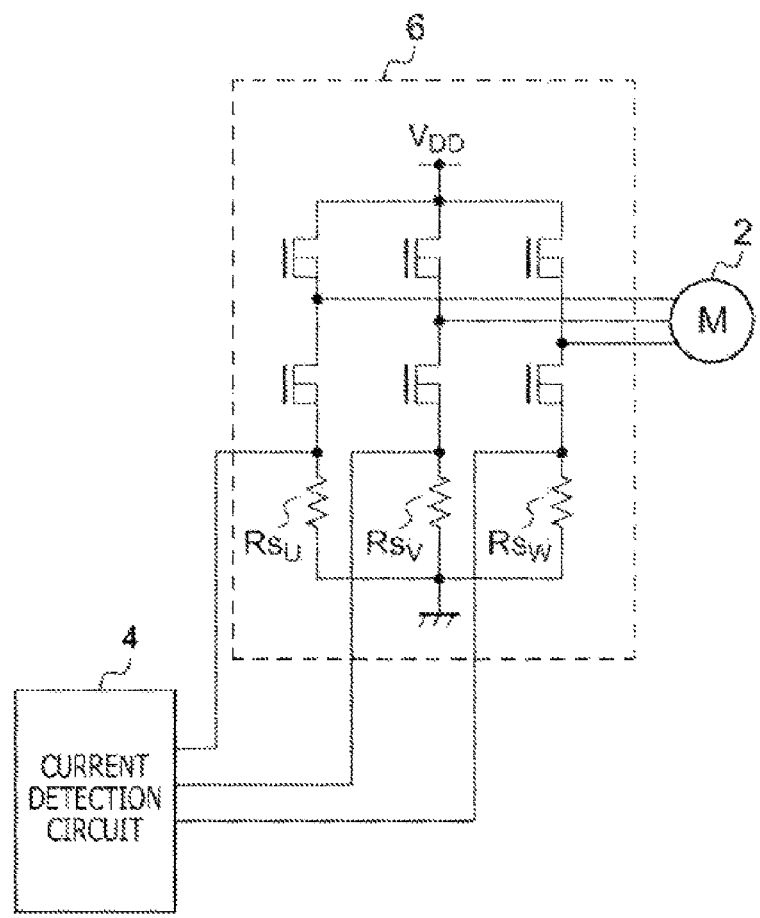
FIG. 2 is an explanatory diagram of current detection of the related art.

An overview of some exemplary embodiments of the present disclosure will be described. The overview describes some simplified concepts of one or a plurality of embodiments for basic understanding of the embodiments as a preface to detailed explanation described later, and the overview does not limit the extent of the technology or the disclosure. The overview is not a comprehensive overview of all conceivable embodiments, and the overview does not limit indispensable constituent elements of the embodiments. For convenience, "one embodiment" may be used to indicate one embodiment (example or modification) or a plurality of embodiments (examples or modifications) disclosed in the present specification.

A control circuit of a three-phase DC motor according to an embodiment is used along with an external resistance. The control circuit includes a current detection circuit that generates a first current detection value indicating an amount of current of a first current flowing through a first phase of a three-phase inverter. The external resistance is an external part provided on a path where the first current is able to flow, and the current detection circuit is able to generate the first current detection value on the basis of a voltage drop of a resistance component of a wire existing on the path of the first current, the wire being formed from a material containing copper, or on the basis of a voltage drop of a first resistance that is an on-resistance of an arm of the first phase, and is able to use, as a standard, a current detection value based on a voltage drop of the external resistance to calibrate the first current detection value based on the voltage drop of the first resistance.

According to this configuration, a series resistance component (parasitic resistance) of a lead or a wire connected to an output of the three-phase inverter or an on-resistance of an arm of the three-phase inverter can be used as a resistance for current detection to thereby detect both the sink current and the source current. Since the resistance component of the lead or the wire is used in place of the external resistance, the cost can be reduced. On the other hand, the temperature dependence of the resistance value of the lead or the wire cannot be ignored. Therefore, one external resistance with small temperature dependence can be added, and the current detection value based on the parasitic resistance can be calibrated by assuming that the current detection value based on the voltage drop of the external resistance is correct. This can secure the accuracy.

In an embodiment, the current detection circuit may be able to generate a second current detection value on the basis of a voltage drop of a resistance component of a wire existing on a path of a second current flowing through a second phase of the three-phase inverter, the wire being formed from a material containing copper, or on the basis of a voltage drop of a second resistance that is an on-resistance of an arm of the second phase, and may be able to generate a third current detection value on the basis of a voltage drop of a resistance component of a wire existing on a path of a third current flowing through a third phase of the three-phase inverter, the wire being formed from a material containing copper, or on the basis of a voltage drop of a third resistance that is an on-resistance of an arm of the third phase. According to this configuration, the output currents of three phases can continuously be detected all the time.

In an embodiment, the first resistance may be an on-resistance of each of a higher arm and a lower arm of the first phase of the three-phase inverter, the second resistance may be an on-resistance of each of a higher arm and a lower arm of the second phase of the three-phase inverter, the third resistance may be an on-resistance of each of a higher arm and a lower arm of the third phase of the three-phase inverter, and the external resistance may be inserted between the three-phase inverter and a ground. Additional parts or wires are not necessary when the on-resistance of the higher arms and the lower arms are used.

In an embodiment, the current detection circuit may use, as a standard, the current detection value based on the voltage drop of the external resistance to calibrate the first current detection value based on a voltage drop of the lower arm of the first phase in a period in which only the first phase is in a current sink phase, may use, as a standard, the current detection value based on the voltage drop of the external resistance to calibrate the second current detection value based on a voltage drop of the lower arm of the second phase in a period in which only the second phase is in the current sink phase, may use, as a standard, the current detection value based on the voltage drop of the external resistance to calibrate the third current detection value based on a voltage drop of the lower arm of the third phase in a period in which only the third phase is in the current sink phase, may use, as a standard, the current detection value based on the voltage drop of the external resistance to calibrate the first current detection value based on a voltage drop of the higher arm of the first phase in a period in which only the first phase is in a current source phase, may use, as a standard, the current detection value based on the voltage drop of the external resistance to calibrate the second current detection value based on a voltage drop of the higher arm of the second phase in a period in which only the second phase is in the current source phase, and may use, as a standard, the current detection value based on the voltage drop of the external resistance to calibrate the third current detection value based on a voltage drop of the higher arm of the third phase in a period in which only the third phase is in the current source phase.

In an embodiment, the first resistance may be a resistance component of a wire provided between a first phase output of the three-phase inverter and the three-phase DC motor, the wire being formed from a material containing copper, the second resistance may be a resistance component of a wire provided between a second phase output of the three-phase inverter and the three-phase DC motor, the wire being formed from a material containing copper, the third resistance may be a resistance component of a wire provided between a third phase output of the three-phase inverter and the three-phase DC motor, the wire being formed from a material containing copper, the external resistance may be inserted between the first phase output of the three-phase inverter and the three-phase DC motor, in series with the first resistance, and the current detection circuit may calibrate the second current detection value and the third current detection value on the basis of a relation between the current detection value based on the voltage drop of the external resistance and the voltage drop of the first resistance. The temperature dependence of the second resistance and the third resistance is the same as the temperature dependence of the first resistance, and the information for the calibration obtained for the first current detection value can be used to calibrate the second current detection value and the third current detection value. Therefore, the output currents of three phases can accurately be detected. There is also an advantage that the measurement for the calibration can be made any time when the first current is non-zero, and therefore, there are few restrictions on the timing of the calibration.

In an embodiment, the first resistance may be a resistance component of a wire provided between a first phase output of the three-phase inverter and the three-phase DC motor, the wire being formed from a material containing copper, the second resistance may be a resistance component of a wire provided between a second phase output of the three-phase inverter and the three-phase DC motor, the wire being formed from a material containing copper, the third resistance may be a resistance component of a wire provided between a third phase output of the three-phase inverter and the three-phase DC motor, the wire being formed from a material containing copper, and the external resistance may be inserted between the first phase output of the three-phase inverter and the three-phase DC motor, in series with the first resistance. The current detection circuit may calibrate the third current detection value on the basis of a relation between the current detection value based on the voltage drop of the external resistance and the voltage drop of the third resistance, when the second current is zero, and may calibrate the second current detection value on the basis of a relation between the current detection value based on the voltage drop of the external resistance and the voltage drop of the second resistance, when the third current is zero. Since the second current and the first current are equal when the third current is zero, the second current detection value can be calibrated. Since the third current and the first current are equal when the second current is zero, the third current detection value can be calibrated.

In an embodiment, the first resistance may be a resistance component of a wire provided between a first phase output of the three-phase inverter and the three-phase DC motor, the wire being formed from a material containing copper, the external resistance may be inserted between a second phase output of the three-phase inverter and the three-phase DC motor, and the current detection circuit may calibrate the first current detection value on the basis of a relation between the current detection value based on the voltage drop of the external resistance and the voltage drop of the first resistance, when a third current flowing through a third phase output is zero.

In an embodiment, the current detection circuit may acquire, as a second current detection value indicating a second current flowing through the second phase output, the current detection value based on the voltage drop of the external resistance, and may acquire a third current detection value indicating the third current, on the basis of a composite value of the first current detection value and the second current detection value. The sum of the output currents of three phases is zero, and this can be used to detect the currents of three phases by using one external resistance and one parasitic resistance.

In an embodiment, the first resistance may be a resistance component of a wire provided between a first phase output of the three-phase inverter and the three-phase DC motor, the wire being formed from a material containing copper, the second resistance may be a resistance component of a wire provided between a second phase output of the three-phase inverter and the three-phase DC motor, the wire being formed from a material containing copper, the third resistance may be a resistance component of a wire provided between a third phase output of the three-phase inverter and the three-phase DC motor, the wire being formed from a material containing copper, and the external resistance may be inserted between the three-phase inverter and a ground.

In an embodiment, the current detection circuit may calibrate the first current detection value in a period in which only the first phase output of the three-phase inverter is in a current sink phase.

In an embodiment, the current detection circuit may be able to generate the second current detection value on the basis of a voltage drop of the second resistance that is the resistance component of the wire provided between the second phase output of the three-phase inverter and the three-phase DC motor, the wire being formed from a material containing copper, and may be able to generate the third current detection value on the basis of a voltage drop of the third resistance that is the resistance component of the wire provided between the third phase output of the three-phase inverter and the three-phase DC motor, the wire being formed from a material containing copper.

In an embodiment, the current detection circuit may calibrate the first current detection value in a period in which only the first phase output of the three-phase inverter is in a current sink phase, may calibrate the second current detection value in a period in which only the second phase output of the three-phase inverter is in the current sink phase, and may calibrate the third current detection value in a period in which only the third phase output of the three-phase inverter is in the current sink phase.

In an embodiment, the control circuit may include a magnetic-detection current sensor in place of the external resistance. The current detection circuit may be able to use, as a standard, a current detection value based on an output of the current sensor to calibrate the first current detection value based on the voltage drop of the first resistance.

In an embodiment, the control circuit may be integrated with one semiconductor substrate. The "integration" includes a case in which all of the constituent elements of the circuit are formed on the semiconductor substrate and a case in which main constituent elements of the circuit are integrated. Part of resistances, capacitors, and the like for adjusting the circuit constant may be provided outside the semiconductor substrate. The circuit can be integrated on one chip, and this can reduce the circuit area and keep the characteristics of the circuit elements uniform.

Embodiment

A preferred embodiment will now be described with reference to the drawings. The same signs are provided to the same or equivalent constituent elements, members, and processes illustrated in the drawings, and duplicate description will appropriately be omitted. The embodiment is exemplary, not intended to limit the disclosure. Not all features and combinations of the features described in the embodiment may be essential for the disclosure.

In the present specification, "a state in which a member A and a member B are connected to each other" includes a case in which the member A and the member B are physically and directly connected to each other as well as a case in which the member A and the member B are indirectly connected to each other through another member that does not substantially affect their electrical connection state and that does not impair the functions and the effects obtained by coupling them.

Similarly, "a state in which a member C is provided between a member A and a member B" includes a case in which the member A and the member C or the member B and the member C are directly connected to each other as well as a case in which they are indirectly connected to each other through another member that does not substantially affect their electrical connection state and that does not impair the functions and the effects obtained by coupling them.

Figure 3:
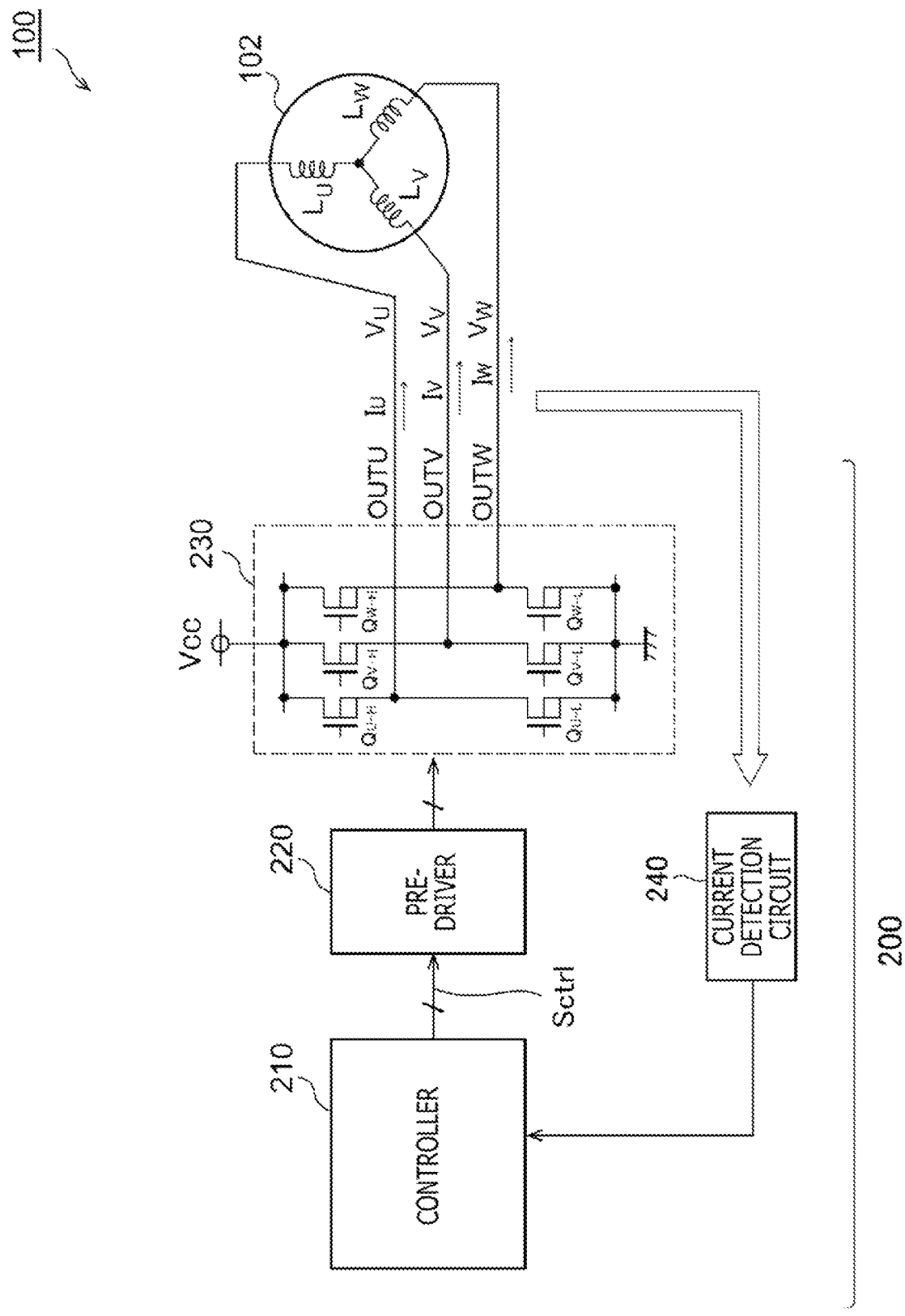
FIG. 3 is a circuit diagram of a drive system of a motor.

FIG. 3 is a circuit diagram of a drive system 100 of a motor. The system 100 includes a brushless three-phase DC motor (hereinafter, simply referred to as a DC motor) 102 and a drive circuit 200.

The DC motor 102 includes a U-phase coil $L_U$, a V-phase coil $L_V$, and a W-phase coil $L_W$. The drive circuit 200 drives the DC motor 102 according to drive signals $V_U$ to $V_W$ supplied to the coils $L_U$ to $L_W$ of the DC motor 102.

The drive circuit 200 includes a controller 210, a pre-driver 220, a three-phase inverter 230, and a current detection circuit 240.

The three-phase inverter 230 is a three-phase bridge circuit including a U-phase leg, a V-phase leg, and a W-phase leg. The leg of a #th phase (#=U, V, or W) includes a higher arm $Q_{\#-H}$ and a lower arm $Q_{\#-L}$. The higher arm and the lower arm each include a switching element, such as a metal oxide semiconductor field effect transistor (MOSFET), an insulated gate bipolar transistor (IGBT), or a bipolar transistor, and a freewheeling diode (also called a flywheel diode) connected in parallel to the switching element. When a MOSFET is used as the switching element as in FIG. 1, a body diode (not illustrated) of the MOSFET is the freewheeling diode.

The current detection circuit 240 detects currents $I_U$, $I_V$, and $I_W$ flowing through the U-phase coil $L_U$, the V-phase coil $L_V$, and the W-phase coil $L_W$ of the DC motor 102 and generates current detection values indicating the currents.

The controller 210 controls the three-phase inverter 230 connected to the DC motor 102 on the basis of the current detection values generated by the current detection circuit 240. For example, the controller 210 generates a control signal Sctrl of the DC motor 102 through vector control.

The pre-driver 220 drives the higher arms $Q_{U-H}$, $Q_{V-H}$, and $Q_{W-H}$ and the lower arms $Q_{U-L}$, $Q_{V-L}$, and $Q_{W-L}$ of the three-phase inverter 230 on the basis of the control signal Sctrl generated by the controller 210.

This completes the description of the overall configuration of the drive circuit 200. Next, current detection performed by the current detection circuit 240 will be described in detail based on some examples.

Example 1

Figure 4:
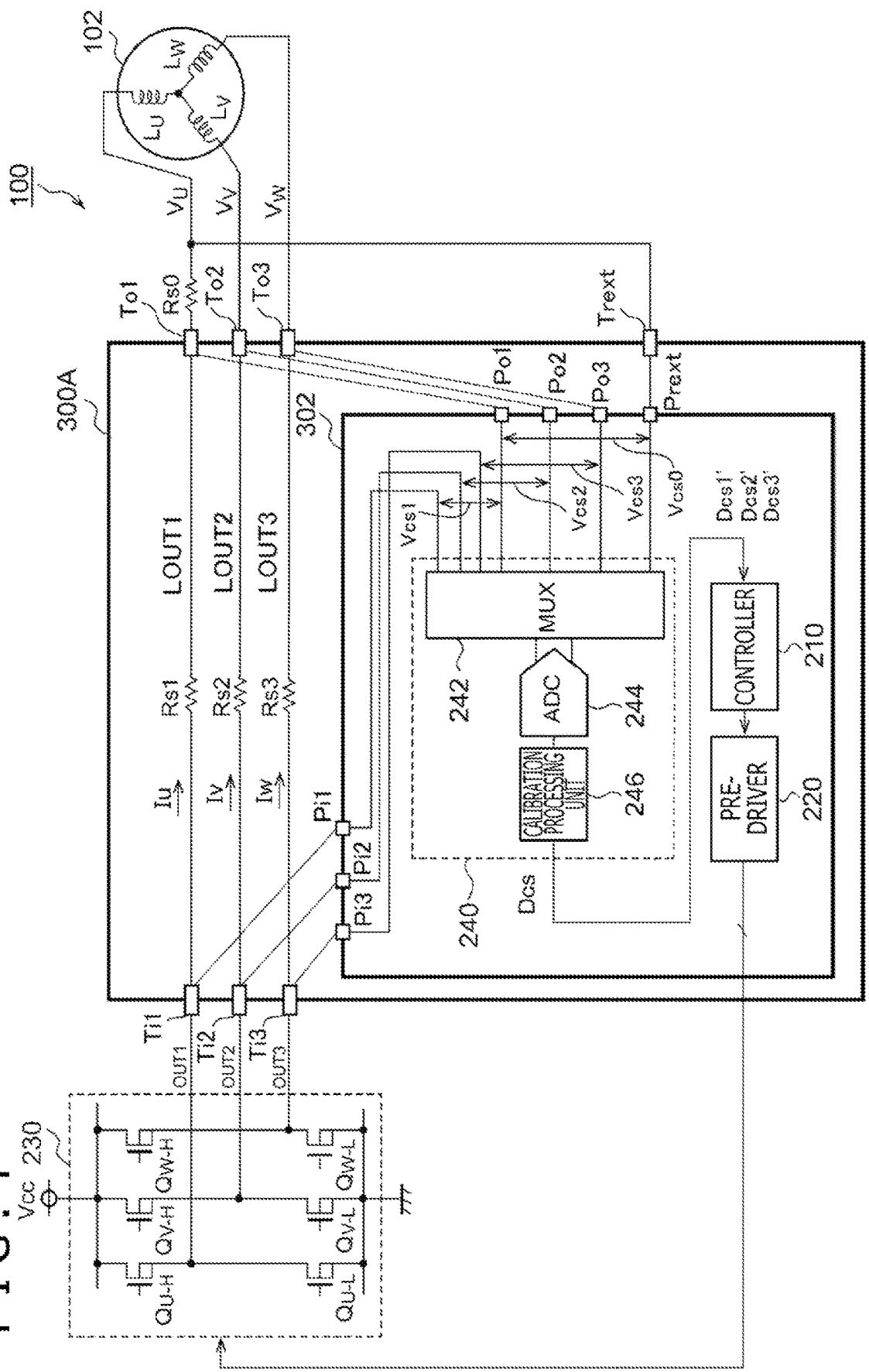
FIG. 4 is a circuit diagram of a control circuit according to Example 1.

FIG. 4 is a circuit diagram of a control circuit 300A according to Example 1. A package of the control circuit 300A includes a semiconductor chip (die) 302 and a plurality of pins (terminals) T. The type of the package is not limited to any particular type. The package may be a quad flat no leaded (QFN) package, a quad flat package (QFP), or a small outline non-leaded (SON) package. The package may be a single inline package (SIP), a dual inline package (DIP), a zigzag inline package (ZIP), a small outline package (SOP), or a small outline J-leaded (SOJ) package including a lead frame. The package may be a ball grid array (BGA) package, a pin grid array (PGA) package, or a land grid array (LGA) package.

The terminals T are external electrode pads, lead electrodes, or bumps, and the terminals T can be in a form corresponding to the type of the package. Pads (or electrodes) P of the semiconductor chip 302 and the terminals T are connected to each other through connectors (interconnects), such as bonding wires, inside the package. The type of the interconnects varies according to the type of the package, and the interconnects can be solder balls or copper pillars (posts) in a case of a flip chip.

In the example, the controller 210, the pre-driver 220, and the current detection circuit 240 are integrated with one semiconductor chip 302, and the three-phase inverter 230 includes an external discrete part, a power module, or an intelligent power module (IPM).

Note that all of the constituent elements of the drive circuit 200 may be housed in the package of the control circuit 300A. In this case, the mode of integrating the constituent elements is not limited to any particular mode, and the constituent elements may be divided into a plurality of semiconductor chips. For example, the controller 210 and the current detection circuit 240 that handle a small signal may be integrated with a first chip (first die), and the pre-driver 220 and the three-phase inverter 230 that handle a large signal may be integrated with a separate second chip (second die). The pre-driver 220 may be provided on the first chip on the small signal side.

The three-phase inverter 230 includes a first phase output (U-phase output) OUT1, a second phase output (V-phase output) OUT2, and a third phase output (W-phase output) OUT3. Note that the correspondence among the first to third phases and the U to W phases are exemplary. The V-phase may be the first phase, or the W-phase may be the first phase. The three-phase outputs OUT1 to OUT3 of the three-phase inverter 230 are connected to the three-phase coils $L_U$, $L_V$, and $L_W$ of the DC motor 102 through output wires LOUT1 to LOUT3.

The currents flowing through the output wires LOUT1 to LOUT3 will be referred to as a first current I1 (U-phase current Iu), a second current I2 (V-phase current Iv), and a third current I3 (W-phase current Iw).

The current detection circuit 240 generates a first current detection value Dcs1 indicating the first current I1 on the basis of a voltage drop of a first resistance Rs1. Similarly, the current detection circuit 240 generates a second current detection value Dcs2 indicating the second current I2 and also generates a third current detection value Dcs3 indicating the third current I3 on the basis of voltage drops of a second resistance Rs2 and a third resistance Rs3, respectively.

The first to third resistances Rs1 to Rs3 do not imply the existence of actual resistance elements, and the first to third resistances Rs1 to Rs3 are series resistance components (parasitic resistances) included in the output wires LOUT1 to LOUT3, respectively.

In the present example, part of the output wire LOUT1 is drawn into the control circuit 300A to generate a resistance component in a level that the resistance component can be used for the current detection. Specifically, the output wire LOUT1 is drawn into the control circuit 300A from an input terminal Ti, is drawn out from an output terminal To through an internal wire (the wire can include a lead, a bonding wire, or a post), and is connected to the DC motor 102.

In the present example, the first resistance Rs1 is an interconnect, such as a lead, a wire, and a post, that connects an input terminal Ti1 and an output terminal To1 inside the package and is a series resistance component (parasitic resistance) of a wire formed from a material containing copper (Cu). For example, in a package using a wire, the resistance component of the wire is dominant in the first resistance Rs1. This similarly applies to the second resistance Rs2 and the third resistance Rs3.

The semiconductor chip 302 includes pads Pi1 to Pi3 connected to input terminals Ti1 to Ti3, respectively, and pads Po1 to Po3 connected to output terminals To1 to To3, respectively. A voltage drop Vcs1 of the first resistance Rs1 occurs between the pads Pi1 and Po1. A voltage drop Vcs2 of the second resistance Rs2 occurs between the pads Pi2 and Po2. A voltage drop Vcs3 of the third resistance Rs3 occurs between the pads Pi3 and Po3.

The current detection circuit 240 generates the first current detection value Dcs1 indicating the first current I1 (U-phase current $I_U$) flowing through the first phase output OUT1 on the basis of the voltage drop Vcs1 of the first resistance Rs1. Similarly, the current detection circuit 240 generates the second current detection value Dcs2 indicating the second current I2 (V-phase current $I_V$) flowing through the second phase output OUT2 on the basis of the voltage drop Vcs2 of the second resistance Rs2. Similarly, the current detection circuit 240 generates the third current detection value Dcs3 indicating the third current I3 (W-phase current $I_W$) flowing through the third phase output OUT3 on the basis of the voltage drop Vcs3 of the third resistance Rs3.

Figure 5:
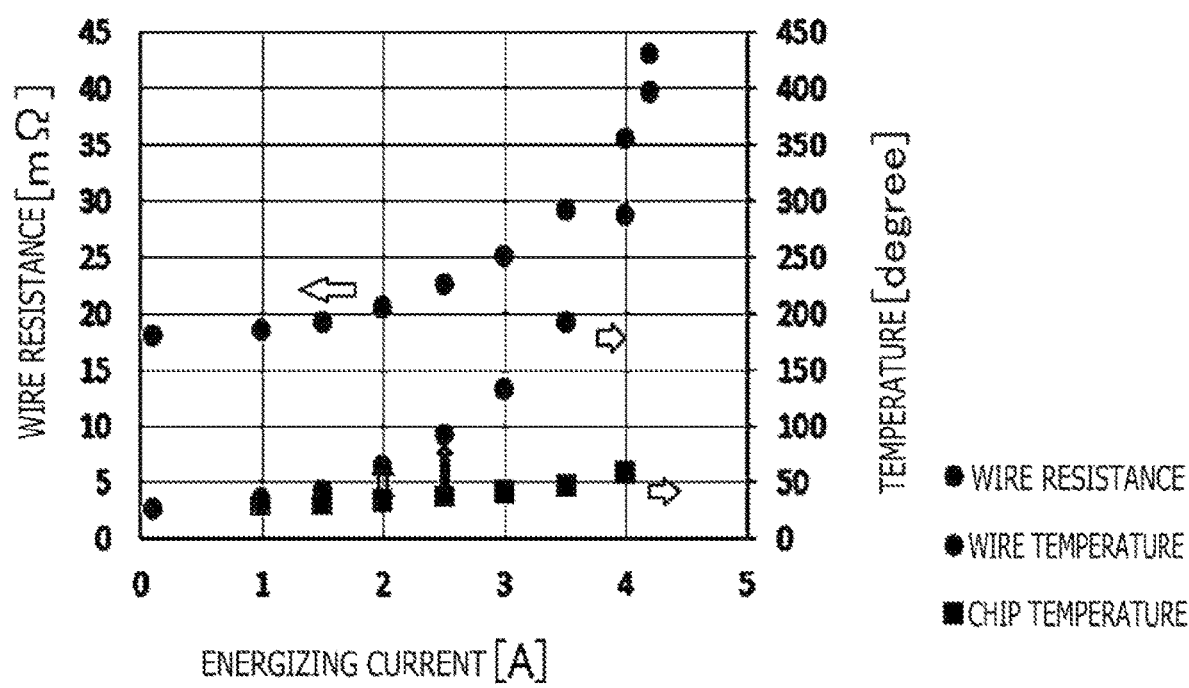
FIG. 5 depicts temperature characteristics of a PdCu wire.

Since the first resistance Rs1 is a wire or a lead frame containing Cu as a main material, the resistance value of the first resistance Rs1 is highly temperature dependent. FIG. 5 depicts temperature characteristics of a PdCu wire. The horizontal axis represents the energizing current of the DC motor 102, and the vertical axis represents the resistance value and the temperature of the wire. When the energizing current is increased, the temperature of the wire rises, and the resistance value of the wire also increases accordingly. On the other hand, the temperature of the semiconductor chip 302 does not rise much even when the energizing current is increased. Therefore, it should be noted that the temperature of the wire is difficult to be recognized by monitoring the temperature of the semiconductor chip 302.

FIG. 4 will be further described. An external resistance Rs0 is provided outside the control circuit 300A, on a path where the first current I1 can flow. In Example 1, the external resistance Rs0 is specifically inserted between the first output terminal To1 and the DC motor 102, in series with the first resistance Rs1. The external resistance Rs0 is a resistance part, such as a chip resistance, and the temperature dependence of the resistance value of the external resistance Rs0 is sufficiently small. Note that the external resistance Rs0 may be provided between the first phase output OUT1 and the first input terminal Ti1 of the three-phase inverter 230.

One end of the external resistance Rs0 is connected to a terminal Trext of the control circuit 300A. A pad Prext of the semiconductor chip 302 and the terminal Trext are connected to each other through an interconnect such as a wire. A voltage drop Vcs0 of the external resistance Rs0 occurs between the pads Po1 and Prext.

The current detection circuit 240 can use, as a standard, a current detection value Dcs0 based on the voltage drop Vcs0 of the external resistance Rs0 to calibrate the first current detection value Dcs1 based on the voltage drop Vcs1 of the first resistance Rs1.

The current detection circuit 240 includes a multiplexer 242, an analog-to-digital (A/D) converter 244, and a calibration processing unit 246. The multiplexer 242 selects one of the plurality of resistances Rs1 to Rs3 and Rs0 and connects it to the A/D converter 244. The A/D converter 244 converts the voltage between the ends of the selected resistance Rs# (#=0, 1, 2, or 3) into a digital detection value Dcs#. The A/D converter 244 may include an amplifier that amplifies small voltage drops Vcs0 to Vcs3 as necessary. The A/D converter 244 may be provided for each resistance, and in that case, the multiplexer 242 can be eliminated.

The calibration processing unit 246 uses, as a standard, the current detection value Dcs0 based on the voltage drop Vcs0 of the external resistance Rs0 to calibrate the first current detection value Dcs1 based on the voltage drop Vcs1 of the first resistance Rs1.

The controller 210 is often implemented in a combination of a processor and a software program in the system that drives the DC motor 102 through the vector control. In that case, the same processor as the processor of the controller 210 can be used to implement the function of the calibration processing unit 246.

The calibration process of the calibration processing unit 246 will be described. The same first current I1 flows through the external resistance Rs0 and the first resistance Rs1. The voltage drop Vcs0 of the external resistance Rs0 is Rs0×I1, and the voltage drop Vcs1 of the first resistance Rs1 is Rs1×I1.

Under the assumption that the current detection value Dcs0 based on the voltage drop Vcs0=Rs0×I1 of the external resistance Rs0 is a true value, the calibration processing unit 246 uses, as a standard, the current detection value Dcs0 to calibrate the current detection value Dcs1 based on the voltage drop Vcs1=Rs1×I1 of the first resistance Rs1.

The calibration processing unit 246 periodically acquires the current detection value Dcs0 based on the voltage drop Vcs0=Rs0×I1 of the external resistance Rs0. The calibration processing unit 246 calculates a ratio of the current detection value Dcs0 to the first current detection value Dcs1 based on the voltage drop Vcs1=Rs1×I1 of the first resistance Rs1 measured at close time.

$$\alpha 1 = Dcs\ 0 / Dcs\ 1 = Rs\ 0 / Rs\ 1 \quad (1)$$

The calibration processing unit 246 holds the ratio α1 as a correction coefficient. Subsequently, the calibration processing unit 246 uses the correction coefficient α1 to correct the generated first current detection value Dcs1. A first current detection value Dcs1' after the correction is as follows.

$$Dcs\ 1' = Dcs\ 1 \times \alpha 1 \quad (2)$$

When Equation (1) is put into Equation (2), the first current detection value Dcs1' after the correction is as follows.

$$Dcs\ 1' = (I1 \times Rs\ 1) \times (Rs\ 0 / Rs\ 1) = I1 \times Rs\ 0 \quad (3)$$

The influence of the fluctuation in resistance value of the first resistance Rs1 is removed.

When the assumption is valid that the first to third resistances Rs1 to Rs3 contain the same material and have the same temperature dependence and thus that the temperatures of the first to third resistances Rs1 to Rs3 are the same, the correction coefficient α1 obtained for the first resistance Rs1 can be used as coefficients α2 and α3 for correcting the second current detection value Dcs2 and the third current detection value Dcs3. Detection values Dcs2' and Dcs3' after the correction are as follows.

$$Dcs\ 2' = Dcs\ 2 \times \alpha 2 = Dcs\ 2 \times \alpha 1$$

$$Dcs\ 3' = Dcs\ 3 \times \alpha 3 = Dcs\ 3 \times \alpha 1$$

That is, the current detection circuit 240 calibrates the second current detection value Dcs2 and the third current detection value Dcs3 on the basis of the relation between the current detection value Dcs0 based on the voltage drop Vcs0 of the external resistance Rs0 and the voltage drop Vcs1 of the first resistance Rs1.

Figure 6:
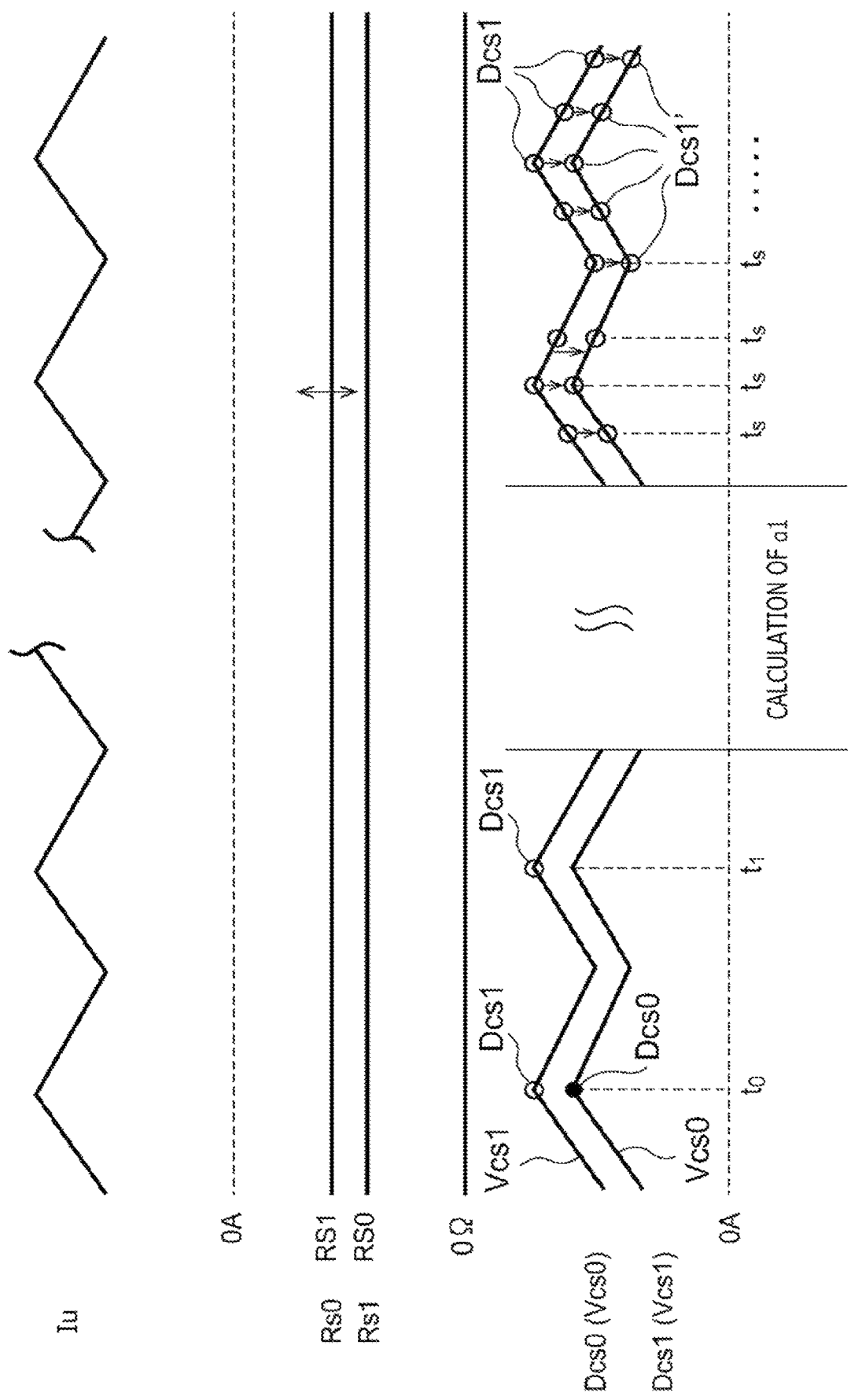
FIG. 6 is a waveform diagram describing a calibration process according to Example 1.

FIG. 6 is a waveform diagram describing a calibration process according to Example 1. FIG. 6 illustrates the coil current I1 ($I_U$), the resistance value of the first resistance Rs1, the resistance value of the external resistance Rs0, the voltage drop Vcs1 of the first resistance Rs1, and the voltage drop Vcs0 of the external resistance Rs0. In the case of PWM control, the voltage drops Vcs0 and Vcs1 may be sampled at the timing of the peak (or the bottom or the center) of the coil current to acquire the current detection values Dcs0 and Dcs1. When the current detection circuit 240 includes two or more A/D converters 244, two voltage drops Vcs0 and Vcs1 may be sampled at the same time $t_0$ to acquire the ratio of the voltage drops Vcs0 and Vcs1.

When the current detection circuit 240 includes one A/D converter 244, one (for example, Vcs0) of the two voltage drops Vcs0 and Vcs1 may be sampled at time $t_0$, and the other (for example, Vcs1) may be sampled at time $t_1$.

Once the acquisition of two current detection values Dcs0 and Dcs1 is completed, the calibration processing unit 246 calculates the correction coefficient α1 corresponding to the ratio of the current detection values Dcs0 and Dcs1.

Once the correction coefficient α1 is obtained, the current detection value Dcs1 obtained at each subsequent sample timing $t_s$ can be multiplied by the correction coefficient α1 to obtain the current detection value Dcs1' after the correction.

This completes the description of the calibration process according to Example 1. According to the calibration process, the current detection value Dcs1' not affected by the fluctuation in resistance value of the first resistance Rs1 can be obtained. Further, the second current detection value Dcs2 and the third current detection value Dcs3 can be multiplied by the same correction coefficient α1 to obtain the current detection value Dcs2' not affected by the fluctuation in resistance value of the second resistance Rs2 and the current detection value Dcs3' not affected by the fluctuation in resistance value of the third resistance Rs3.

Example 1 is effective when it can be assumed that the temperatures of the first to third resistances Rs1 to Rs3 are the same, such as in a package in which three terminals To1 to To3 of FIG. 3 are adjacent to each other.

The current detection circuit 240 may update the correction coefficient α1 every time the drive condition of the DC motor 102 is switched. The switch in the drive condition may be a switch in the energizing current or a switch in the energizing system. Alternatively, the current detection circuit 240 may periodically update the correction coefficient α1.

Example 2

Figure 7:
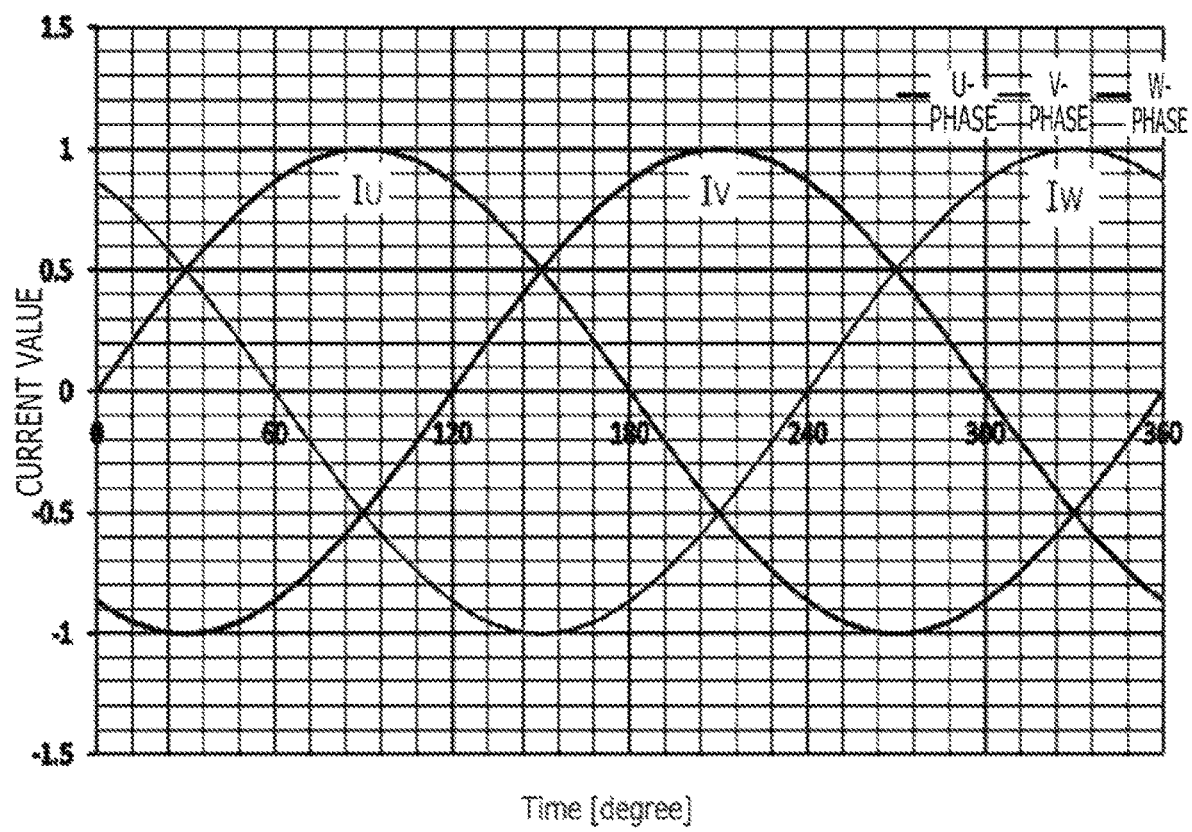
FIG. 7 is a waveform diagram describing a calibration process according to Example 2.

FIG. 7 is a waveform diagram describing a calibration process according to Example 2. FIG. 6 illustrates the output currents $I_U$ to $I_W$ of three phases in 180-degree energization (sine wave drive) control.

The amount of first current $I_U$ and the amount of third current $I_W$ are equal at the time at which the second current $I_V$ is zero (electrical angles of 120 degrees and 300 degrees), and the same amount of current flows through the external resistance Rs0 and the third resistance Rs3. Therefore, the voltage drop Vcs3 of the third resistance Rs3 and the voltage drop Vcs0 of the external resistance Rs0 can be sampled at the time at which it can be assumed that the same amount of current is flowing or during a time interval very close to the above-mentioned time, and the correction coefficient α3 can be calculated on the basis of the relation between the two current detection values Dcs3 and Dcs0.

$$\alpha 3 = Dcs\ 0/Dcs\ 3 = Rs\ 0/Rs\ 3 \quad (4)$$

Similarly, the amount of first current $I_U$ and the amount of second current $I_V$ are equal at the time at which the third current $I_W$ is zero (electrical angles of 60 degrees and 240 degrees), and the same amount of current flows through the external resistance Rs0 and the second resistance Rs2. Therefore, the voltage drop Vcs2 of the second resistance Rs2 and the voltage drop Vcs0 of the external resistance Rs0 can be sampled at time $t_2$ at which it can be assumed that the same amount of current is flowing or during a time interval very close to time, and the correction coefficient α2 can be calculated on the basis of the relation between the two current detection values Dcs2 and Dcs0.

$$\alpha 2 = Dcs\ 0/Dcs\ 2 = Rs\ 0/Rs\ 2 \quad (5)$$

Note that, since the same amount of current always flows through the first resistance Rs1 and the external resistance Rs0, the time of acquiring the two current detection values Dcs1 and Dcs0 for calculating the correction coefficient α1 is not limited to any particular time.

Example 2 is effective when the temperatures of the first to third resistances Rs1 to Rs3 may be different. For example, Example 2 is effective in a package in which three terminals To1 to To3 of FIG. 3 are not adjacent to each other.

Example 3

Figure 8:
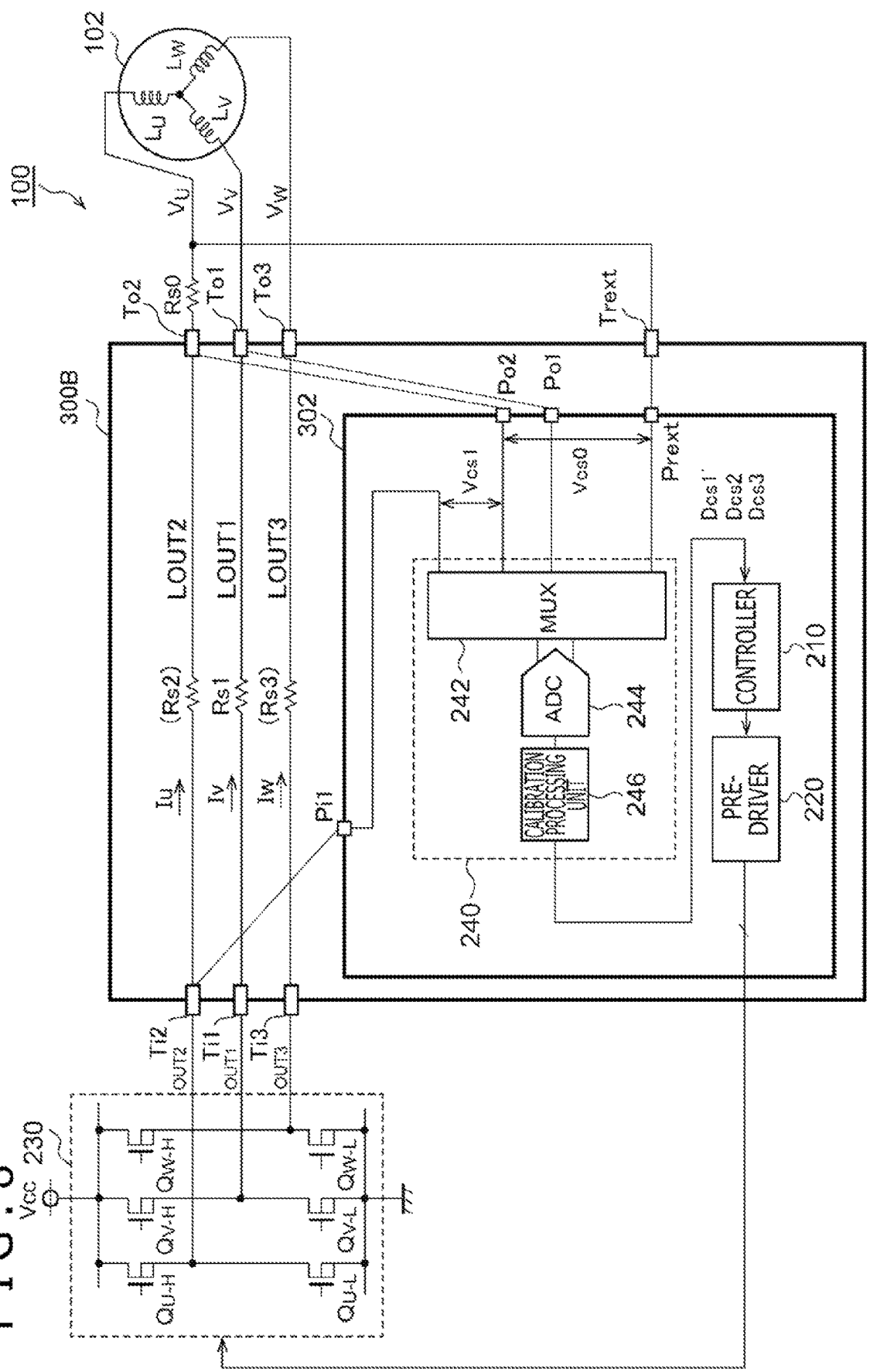
FIG. 8 is a circuit diagram of a control circuit according to Example 3.

FIG. 8 is a circuit diagram of a control circuit 300B according to Example 3. In Example 3, the U-phase is the second phase, the V-phase is the first phase, and the W-phase is the third phase. The external resistance Rs0 is inserted between the second output terminal To2 and the DC motor 102. The current detection circuit 240 can detect the voltage drop Vcs1 of the first resistance Rs1 and the voltage drop Vcs0 of the external resistance Rs0. Since the entities of the second resistance Rs2 and the third resistance Rs3 are parasitic resistances of wires or lead frames, the second resistance Rs2 and the third resistance Rs3 are not used for the current detection in the present example, although the current is not zero. When, for example, a resistance component of a wire is used as the first resistance Rs1, the wire of the terminals Ti2 and To2 and the wire of the terminals Ti3 and To3 may be shorter than the wire of the terminals Ti1 and To1. Alternatively, only the first output wire LOUT1 may be drawn into the package, and the second output wire LOUT2 and the third output wire LOUT3 may not be drawn into the package.

The current detection circuit 240 samples the voltage drop Vcs1 of the first resistance Rs1 and generates the first current detection value Dcs1 indicating the output current $I_1$ ($I_V$) of the first phase.

The current detection circuit 240 samples the voltage drop Vcs0 of the external resistance Rs0 and generates the current detection value Dcs0.

The current detection circuit 240 uses, as a standard, the current detection value Dcs0 to calibrate the first current detection value Dcs1 and outputs the first current detection value Dcs1' after the calibration.

A calibration process in Example 3 will be described. When the third current $I_3$ ($I_W$) flowing through the third phase output OUT3 is zero, the current detection circuit 240 calibrates the first current detection value Dcs1 on the basis of the relation between the current detection value Dcs2 based on the voltage drop Vcs0 of the external resistance Rs0 and the voltage drop Vcs1 of the first resistance Rcs1.

Since the amount of first current I1 and the amount of second current I2 are equal at the time at which the third current $I_3$ is zero, the same amount of current flows through the external resistance Rs0 and the first resistance Rs1. Therefore, the voltage drop Vcs1 of the first resistance Rs1 and the voltage drop Vcs0 of the external resistance Rs0 can be sampled at the time at which it can be assumed that the same amount of current is flowing or during a time interval very close to the above-mentioned time, and the correction coefficient α1 can be calculated based on the relation between the two current detection values Dcs1 and Dcs2.

$$\alpha 1 = Dcs\ 2/Dcs\ 1 = Rs\ 0/Rs\ 1 \quad (4)$$

The calibration processing unit 246 holds the ratio α1 as a correction coefficient. Subsequently, the calibration processing unit 246 uses the correction coefficient α1 to correct the generated first current detection value Dcs1. The first current detection value Dcs1' after the correction is as follows.

$$Dcs\ 1' = Dcs\ 1 \times \alpha 1 \quad (2)$$

The current detection circuit 240 outputs, as the second current detection value Dcs2 indicating the second current I2, the current detection value Dcs0 based on the external resistance Rs0.

$$Dcs\ 2 = Dcs\ 0$$

The current detection circuit 240 further generates the third current detection value Dcs3 on the basis of the first current detection value Dcs1' and the second current detection value Dcs2 (=Dcs0).

$$Dcs\ 3 = -Dcs\ 1' - Dcs\ 2$$

According to Example 3, one internal resistance Rs1 and one external resistance Rs0 can be used to detect the currents of all three phases.

Example 4

Figure 9:
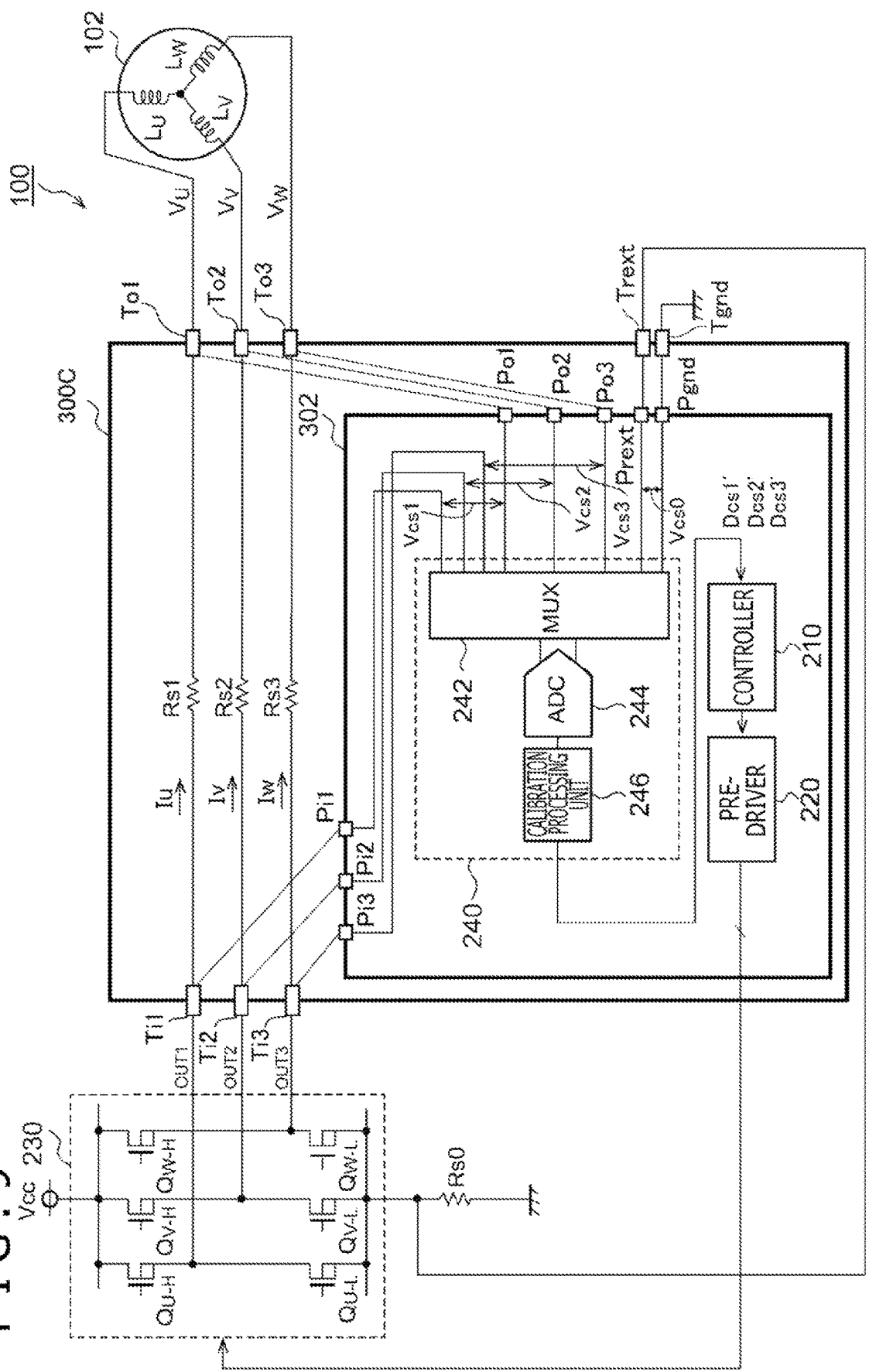
FIG. 9 is a circuit diagram of a control circuit according to Example 4.

FIG. 9 is a circuit diagram of a control circuit 300C according to Example 4. A current detection terminal TCS is connected to a low potential node of the three-phase inverter 230. The external resistance Rs0 is a shunt resistance inserted between the current detection terminal TCS and an external ground. A ground terminal TGND is grounded.

The current detection circuit 240 generates the first current detection value Dcs1 indicating the first current I1 (U-phase current $I_U$) flowing through the first phase output OUT1 on the basis of the voltage drop Vcs1 of the first resistance Rs1 as in Example 1. Similarly, the current detection circuit 240 generates the second current detection value Dcs2 indicating the second current I2 (V-phase current $I_V$) flowing through the second phase output OUT2 on the basis of the voltage drop Vcs2 of the second resistance Rs2. Similarly, the current detection circuit 240 generates the third current detection value Dcs3 indicating the third current I3 (W-phase current $I_W$) flowing through the third phase output OUT3 on the basis of the voltage drop Vcs3 of the third resistance Rs3.

The current detection circuit 240 calibrates the first current detection value Dcs1 in a period or at a timing that only the first phase output of the three-phase inverter is in the current sink phase.

In a period in which only the first phase output OUT1 of the three-phase inverter 230 is in the sink phase for receiving the current, and the second phase output OUT2 and the third phase output OUT3 are in the source phase for supplying the current, the current I1 received by the first phase output OUT1 flows to the external resistance Rs0 through the resistance Rs1. That is, the same current flows through two resistances Rs1 and Rs0. Therefore, the current detection circuit 240 acquires the first current detection value Dcs1 and the current detection value Dcs0 in the period or at the timing that only the first phase output OUT1 is in the current sink phase and acquires the correction coefficient α1 based on the ratio of the two.

$$α1=Dcs\ 0/Dcs\ 1$$

After acquiring the correction coefficient α1, the current detection circuit 240 uses the correction coefficient α1 to correct the first current detection value Dcs1.

$$Dcs\ 1'=Dcs\ 1×α1$$

Similarly, in a period or at a timing that only the second phase output OUT2 of the three-phase inverter 230 is in the sink phase for receiving the current, the current I2 received by the second phase output OUT2 flows to the external resistance Rs0 through the resistance Rs2. That is, the same current flows through two resistances Rs2 and Rs0. Therefore, the current detection circuit 240 acquires the second current detection value Dcs2 and the current detection value Dcs0 in the period or at the timing that only the second phase output OUT2 is in the current sink phase and acquires the correction coefficient α2 based on the ratio of the two.

$$α2=Dcs\ 0/Dcs\ 2$$

Subsequently, the current detection circuit 240 uses the correction coefficient α2 to correct the second current detection value Dcs2.

$$Dcs\ 2'=Dcs\ 2×α2$$

Similarly, in a period or at a timing that only the third phase output OUT3 of the three-phase inverter 230 is in the sink phase for receiving the current, the current I3 received by the third phase output OUT3 flows to the external resistance Rs0 through the resistance Rs3. That is, the same current flows through two resistances Rs3 and Rs0. Therefore, the current detection circuit 240 acquires the third current detection value Dcs3 and the current detection value Dcs0 in the period or at the timing that only the third phase output OUT3 is in the current sink phase and acquires the correction coefficient α3 based on the ratio of the two.

$$α3=Dcs\ 0/Dcs\ 3$$

Subsequently, the current detection circuit 240 uses the correction coefficient α3 to correct the third current detection value Dcs3.

$$Dcs\ 3'=Dcs\ 3×α3$$

Figure 10:
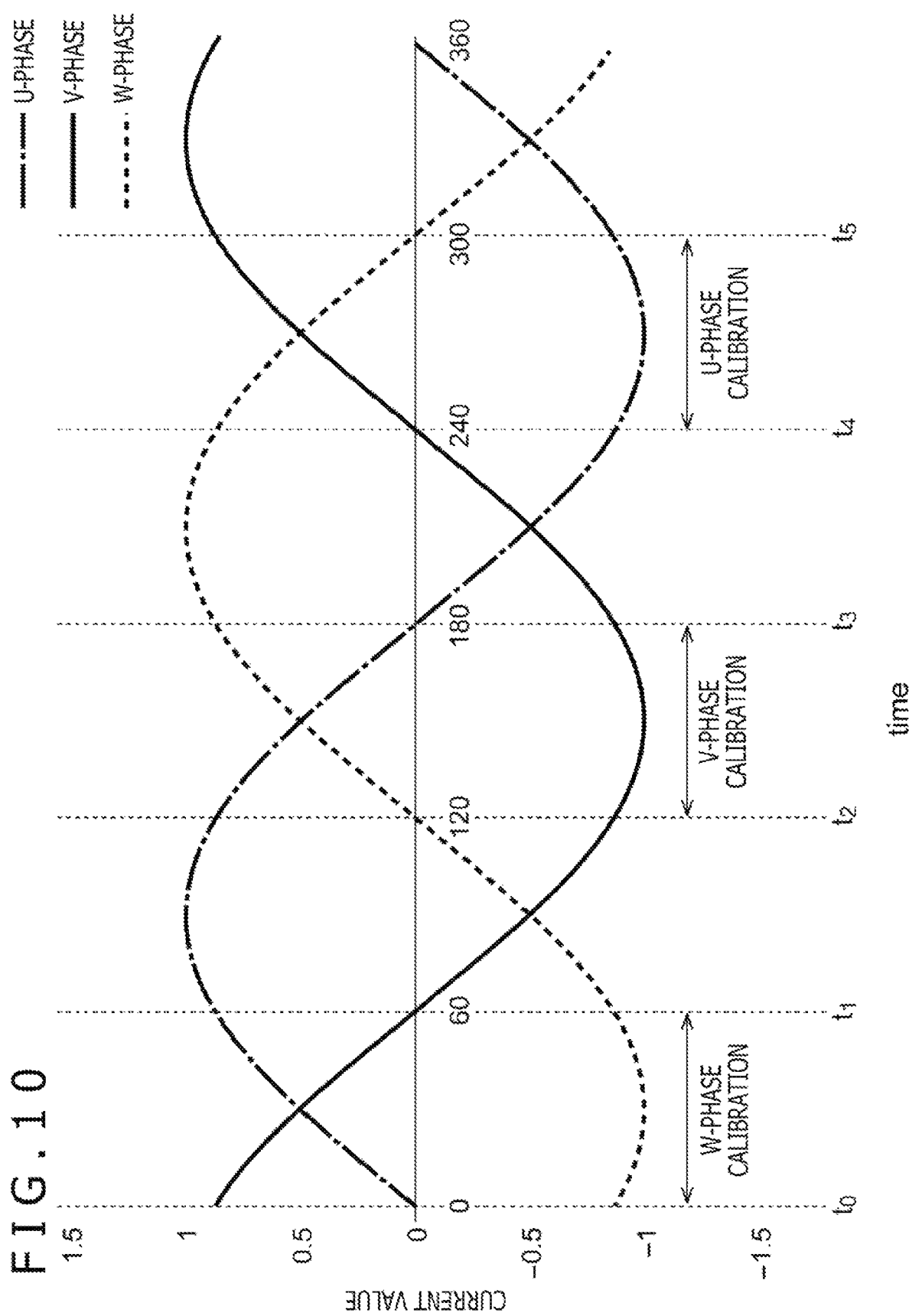
FIG. 10 is a waveform diagram describing a calibration process in the control circuit of FIG. 9.

FIG. 10 is a waveform diagram describing a calibration process in the control circuit 300C of FIG. 9. The horizontal axis represents time expressed by electrical angle. In a period of 0° to 60°, only the W-phase current is negative, that is, only the W-phase output is in the current sink phase. Therefore, the information (correction coefficient α3) for correcting the third current detection value Dcs3 can be obtained in the period of 0° to 60°.

In a period of 120° to 180°, only the V-phase current is negative, that is, only the V-phase output is in the current sink phase. Therefore, the information (correction coefficient α2) for correcting the second current detection value Dcs2 can be obtained in the period of 120° to 180°.

In a period of 240° to 300°, only the U-phase current is negative, that is, only the U-phase output is in the current sink phase. Therefore, the information (correction coefficient α1) for correcting the first current detection value Dcs1 can be obtained in the period of 240° to 300°.

For example, the current detection circuit 240 may acquire the information for the correction at the timing at which one of the currents is zero, such as at 60°, 120°, 180°, 240°, and 300°.

According to Example 4, effects similar to the effects of Examples 1 to 3 can be obtained.

Example 5

Figure 11:
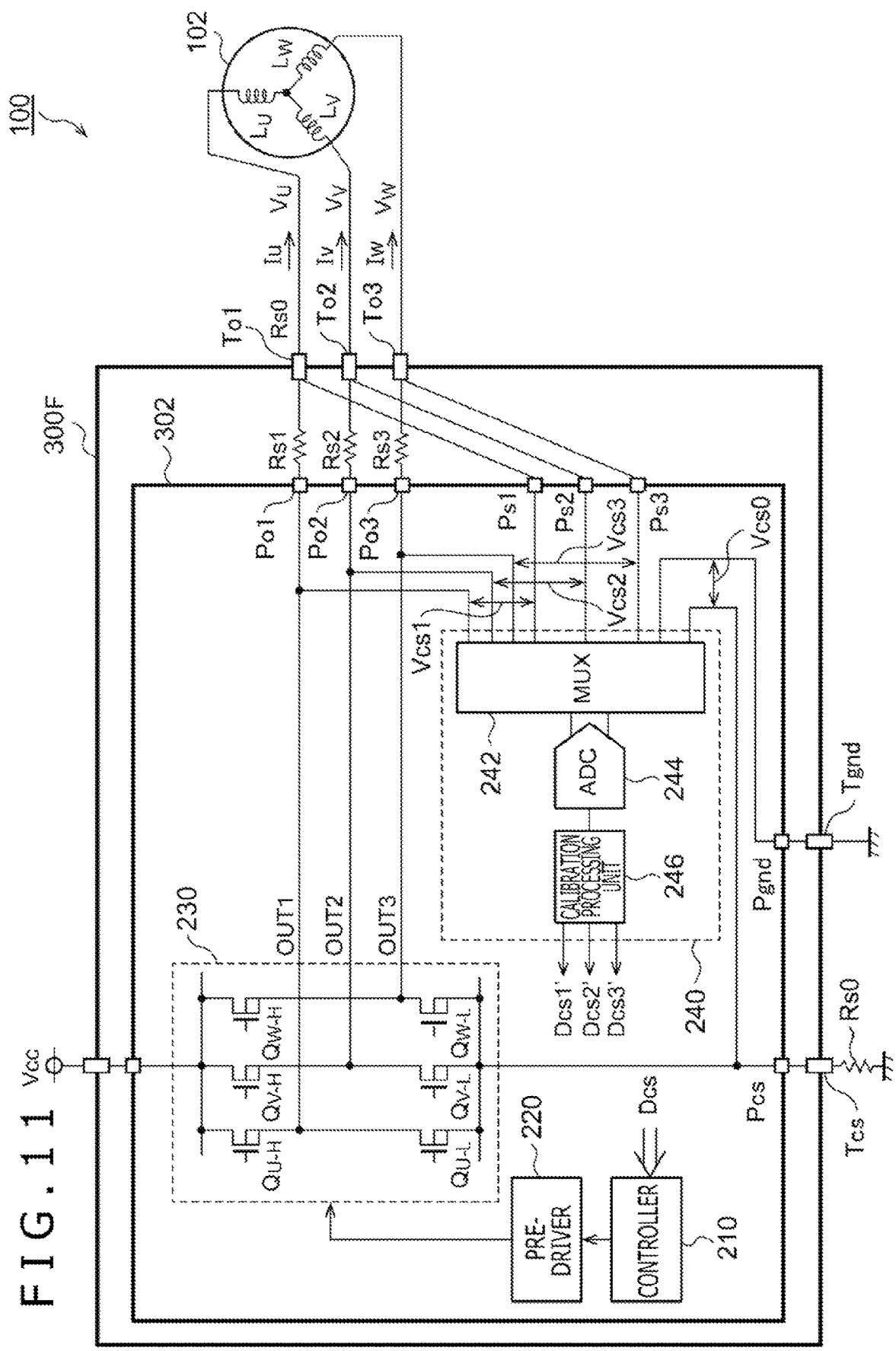
FIG. 11 is a circuit diagram of a control circuit according to Example 5.

FIG. 11 is a circuit diagram of a control circuit 300F according to Example 5. Example 5 is a modification of Example 4, and the three-phase inverter 230 that is external in Example 4 is integrated with the semiconductor chip 302 in Example 5.

The outputs OUT1 to OUT3 of the three-phase inverter 230 are connected to the output pads Po1 to Po3 of the semiconductor chip 302. The output pads Po1 to Po3 are connected to the output terminals To1 to To3 through interconnects such as wires. In Example 5, the direct resistance components of the interconnects are used as the first to third resistances Rs1 to Rs3.

Pads Ps1 to Ps3 of the semiconductor chip 302 are connected to the output terminals To1 to To3. A voltage drop Vs1 of the first resistance Rs1 occurs between the pads Ps1 and Po1. A voltage drop Vs2 of the second resistance Rs2 occurs between the pads Ps2 and Po2. A voltage drop Vs3 of the third resistance Rs3 occurs between the pads Ps3 and Po3.

A ground terminal Tgnd of the control circuit 300F is grounded, and a current detection terminal Tcs is grounded through the external resistance Rs0. A pad Pgnd of the semiconductor chip 302 is connected to the terminal Tgnd. The voltage drop Vcs0 of the external resistance Rs0 occurs between pads Pcs and Pgnd.

The voltage drops Vcs0 to Vcs3 are input to the current detection circuit 240. The current detection circuit 240 generates the current detection values Dcs1 to Dcs3 as in Example 4 and corrects the current detection values Dcs1 to Dcs3. According to Example 5, effects similar to the effects of Example 4 can be obtained.

Example 6

FIG. 12 is a circuit diagram of a control circuit 300D according to Example 6. In Examples 1 to 5, the series resistance component of the wire made of a material containing Cu is used to detect the current. In Example 6, the on-resistance of the arm of the three-phase inverter 230 is used as the first resistance Rs1 instead of the series resistance component of the wire. Similarly, the on-resistance of the arm of the three-phase inverter 230 is used as the second resistance Rs2 and the third resistance Rs3.

When an arm is on, a voltage drop proportional to the product of the on-resistance and the current occurs in the arm.

Specifically, the on-resistance of the higher arm $Q_{U-H}$ and the lower arm $Q_{U-L}$ of the first phase (U-phase) corresponds to the first resistance Rs1. The on-resistance of the higher arm $Q_{V-H}$ and the lower arm $Q_{V-L}$ of the second phase (V-phase) corresponds to the second resistance Rs2. The on-resistance of the higher arm $Q_{W-H}$ and the lower arm $Q_{W-L}$ of the third phase (W-phase) corresponds to the third resistance Rs3.

The control circuit 300D can detect the voltage between the ends of each arm. Terminals Ts1 to Ts3 of the control circuit 300D are connected to the outputs OUT1 to OUT3 of the three-phase inverter 230. A terminal Tvcc is connected to a power terminal of the three-phase inverter 230. The terminal Tcs is connected to the external resistance Rs0, and the ground terminal Tgnd is grounded.

Pads Pvcc, Pcs, Pgnd, and Ps1 to Ps3 of the semiconductor chip 302 are connected to the terminals Tvcc, Tcs, Tgnd, and Ts1 to Ts3, respectively.

A voltage drop $V_{\#-H}$ of the higher arm $Q_{\#-H}$ of the #th phase occurs between the pad Ps # and the pad Pvcc, and a voltage drop $V_{\#-L}$ of the lower arm $Q_{\#-L}$ of the #th phase occurs between the pad Ps # and the pad Pcs, where #=1 to 3. The voltage drop Vcs0 of the external resistance Rs0 occurs between the pad Pcs and the pad Pgnd.

The current detection circuit 240 generates the current detection values Dcs1 to Dcs3 indicating the first to third currents I1 to I3 flowing through the first to third phases on the basis of the voltage drops of the arms.

Specifically, when the first phase (U-phase) is in the source phase, a current detection value $Dcs1_H$ indicating the first current I1 is generated based on the voltage drop $V_{U-H}$ of the higher arm $Q_{U-H}$ of the first phase. When the first phase (U-phase) is in the current sink mode, a current detection value $Dcs1_L$ indicating the first current I1 is generated based on the voltage drop $V_{U-L}$ of the lower arm $Q_{U-L}$ of the first phase.

Similarly, when the second phase (V-phase) is in the source phase, a current detection value $Dcs2_H$ indicating the second current I2 is generated based on the voltage drop $V_{V-H}$ of the higher arm $Q_{V-H}$ of the second phase. When the second phase (V-phase) is in the current sink mode, a current detection value $Dcs2_L$ indicating the second current I2 is generated based on the voltage drop $V_{V-L}$ of the lower arm $Q_{V-L}$ of the second phase.

Similarly, when the third phase (W-phase) is in the source phase, a current detection value $Dcs3_H$ indicating the third current I3 is generated based on the voltage drop $V_{W-H}$ of the higher arm $Q_{W-H}$ of the third phase. When the third phase (W-phase) is in the current sink mode, a current detection value $Dcs3_L$ indicating the third current I3 is generated based on the voltage drop $V_{W-L}$ of the lower arm $Q_{W-L}$ of the third phase.

The current detection circuit 240 acquires information necessary for correcting the current detection values Dcs1 to Dcs3 on the basis of the voltage drop Vcs0 of the external resistance Rs0. The calibration can be performed similarly to that in Example 4 in which the combination of the series resistance component of the Cu wire and the shunt resistance is used. However, different correction coefficients are generated for the current detection value $Dcs\#_H$ based on the higher arm and the current detection value $Dcs\#_L$ based on the lower arm.

For example, the current detection circuit 240 acquires information (correction coefficient $\alpha1_H$) necessary for correcting the current detection value $Dcs1_H$ based on the voltage drop $V_{U-H}$ of the higher arm $Q_{U-H}$ of the first phase in a period in which only the first phase (U-phase) output OUT1 of the three-phase inverter 230 is in the current source phase (I1>0, I2≤0, I3≤0).

$$\alpha1_H = Dcs\,0/Dcs\,1_H$$

The current detection circuit 240 acquires information (correction coefficient $\alpha1_L$) necessary for correcting the current detection value $Dcs1_L$ based on the voltage drop $V_{U-L}$ of the lower arm $Q_{U-L}$ of the first phase in a period in which only the first phase (U-phase) output OUT1 of the three-phase inverter 230 is in the current sink phase (I1<0, I2≥0, I3≥0).

$$\alpha1_L = Dcs\,0/Dcs\,1_L$$

The current detection circuit 240 acquires information (correction coefficient $\alpha2_H$) necessary for correcting the current detection value $Dcs2_H$ based on the voltage drop $V_{V-H}$ of the higher arm $Q_{V-H}$ of the second phase in a period in which only the second phase (V-phase) output OUT2 of the three-phase inverter 230 is in the current source phase (I2>0, I1≤0, I3≤0).

$$\alpha2_H = Dcs\,0/Dcs\,2_H$$

The current detection circuit 240 acquires information (correction coefficient $\alpha2_L$) necessary for correcting the current detection value $Dcs2_L$ based on the voltage drop $V_{V-L}$ of the lower arm $Q_{V-L}$ of the second phase in a period in which only the second phase (V-phase) output OUT2 of the three-phase inverter 230 is in the current sink phase (I2<0, I1≥0, I3≥0).

$$\alpha2_L = Dcs\,0/Dcs\,2_L$$

The current detection circuit 240 acquires information (correction coefficient $\alpha3_H$) necessary for correcting the current detection value $Dcs\,3_H$ based on the voltage drop $V_{W-H}$ of the higher arm $Q_{W-H}$ of the third phase in a period in which only the third phase (W-phase) output OUT3 of the three-phase inverter 230 is in the current source phase (I3>0, I1≤0, I2≤0).

$$\alpha3_H = Dcs\,0/Dcs\,3_H$$

The current detection circuit 240 acquires information (correction coefficient $\alpha3_L$) necessary for correcting the current detection value $Dcs3_L$ based on the voltage drop $V_{W-L}$ of the lower arm $Q_{W-L}$ of the third phase in a period in which only the third phase (W-phase) output OUT3 of the three-phase inverter 230 is in the current sink phase (I3<0, I1≥0, I2≥0).

$$\alpha 3_L = Dcs\ 0/Dcs\ 3_L$$

The current detection circuit 240 corrects the current detection values on the basis of the correction coefficients.

$$Dcs\ 1_H' = Dcs\ 1_H \times \alpha 1_H$$

$$Dcs\ 1_L' = Dcs\ 1_L \times \alpha 1_L$$

$$Dcs\ 2_H' = Dcs\ 2_H \times \alpha 2_H$$

$$Dcs\ 2_L' = Dcs\ 2_L \times \alpha 2_L$$

$$Dcs\ 3_H' = Dcs\ 3_H \times \alpha 3_H$$

$$Dcs\ 3_L' = Dcs\ 3_L \times \alpha 3_L$$

FIG. 13 is a waveform diagram describing a calibration process in the control circuit 300D of FIG. 12.

Only the W-phase output is in the current sink phase in the period of 0° to 60°, and the information (correction coefficient $\alpha 3_L$) for correcting the third current detection value $Dcs3_L$ based on the voltage drop $V_{W-L}$ of the W-phase lower arm $Q_{W-L}$ can be obtained.

Only the U-phase output is in the current source phase in the period of 60° to 120°, and the information (correction coefficient $\alpha 1_H$) for correcting the first current detection value $Dcs1_H$ based on the voltage drop $V_{U-H}$ of the U-phase higher arm $Q_{U-H}$ can be obtained.

Only the V-phase output is in the current sink phase in the period of 120° to 180°, and the information (correction coefficient $\alpha 2_L$) for correcting the second current detection value $Dcs2_L$ based on the voltage drop $V_{V-L}$ of the V-phase lower arm $Q_{V-L}$ can be obtained.

Only the W-phase output is in the current source phase in the period of 180° to 240°, and the information (correction coefficient $\alpha 3_H$) for correcting the third current detection value $Dcs3_H$ based on the voltage drop $V_{W-H}$ of the W-phase higher arm $Q_{W-H}$ can be obtained.

Only the U-phase output is in the current sink phase in the period of 240° to 300°, and the information (correction coefficient $\alpha 1_L$) for correcting the first current detection value $Dcs1_L$ based on the voltage drop $V_{U-L}$ of the U-phase lower arm $Q_{U-L}$ can be obtained.

Only the V-phase output is in the current source phase in the period of 300° to 360°, and the information (correction coefficient $\alpha 2_H$) for correcting the second current detection value $Dcs2_H$ based on the voltage drop $V_{V-H}$ of the V-phase higher arm $Q_{V-H}$ can be obtained.

For example, the current detection circuit 240 may acquire the information for the correction at the timing at which one of the currents is zero, such as at 60°, 120°, 180°, 240°, and 300°.

At time $t_0$ where the U-phase current (first current) is 0, the V-phase current (second current) is positive, and the W-phase current (third current) is negative. In this case, the same amount of current flows through the V-phase higher arm $Q_{V-H}$, the W-phase lower arm $Q_{W-L}$, and the external resistance (shunt resistance) Rs0.

The calibration processing unit 246 uses, as a standard, the current detection value Dcs0 at time $t_0$ to acquire the information (correction coefficient $\alpha 2_H$) necessary for correcting the current detection value $Dcs2_H$ based on the voltage drop $Q_{V-H}$ of the V-phase higher arm $Q_{V-H}$.

The calibration processing unit 246 uses, as a standard, the current detection value Dcs0 at time $t_0$ to acquire the information (correction coefficient $\alpha 3_L$) necessary for correcting the current detection value $Dcs3_L$ based on the voltage drop $Q_{W-L}$ of the W-phase lower arm $Q_{W-L}$.

At time $t_1$ where the V-phase current (second current) is 0, the U-phase current (first current) is positive, and the W-phase current (third current) is negative. In this case, the same amount of current flows through the U-phase higher arm $Q_{U-H}$, the W-phase lower arm $Q_{W-L}$, and the external resistance (shunt resistance) Rs0.

The calibration processing unit 246 uses, as a standard, the current detection value Dcs0 at time $t_1$ to acquire the information (correction coefficient odd for correcting the current detection value $Dcs1_H$ based on the voltage drop $Q_{U-H}$ of the U-phase higher arm $Q_{U-H}$.

The calibration processing unit 246 uses, as a standard, the current detection value Dcs0 at time $t_1$ to acquire the information (correction coefficient $\alpha 3_L$) for correcting the current detection value $Dcs3_L$ based on the voltage drop $Q_{W-L}$ of the W-phase lower arm $Q_{W-L}$.

At time $t_2$ where the W-phase current (third current) is 0, the U-phase current (first current) is positive, and the V-phase current (second current) is negative. In this case, the same amount of current flows through the U-phase higher arm $Q_{U-H}$, the V-phase lower arm $Q_{V-L}$, and the external resistance (shunt resistance) Rs0.

The calibration processing unit 246 uses, as a standard, the current detection value Dcs0 at time $t_2$ to acquire the information (correction coefficient odd for correcting the current detection value $Dcs1_H$ based on the voltage drop $Q_{U-H}$ of the U-phase higher arm $Q_{U-H}$.

The calibration processing unit 246 uses, as a standard, the current detection value Dcs0 at time $t_2$ to acquire the information (correction coefficient $\alpha 2_L$) for correcting the current detection value $Dcs2_L$ based on the voltage drop $Q_{V-L}$ of the V-phase lower arm $Q_{V-L}$.

At time $t_3$ where the U-phase current (first current) is 0, the W-phase current (third current) is positive, and the V-phase current (second current) is negative. In this case, the same amount of current flows through the W-phase higher arm $Q_{W-H}$, the V-phase lower arm $Q_{V-L}$, and the external resistance (shunt resistance) Rs0.

The calibration processing unit 246 uses, as a standard, the current detection value Dcs0 at time $t_3$ to acquire the information (correction coefficient $\alpha 3_H$) for correcting the current detection value $Dcs3_H$ based on the voltage drop $Q_{W-H}$ of the W-phase higher arm $Q_{W-H}$.

The calibration processing unit 246 uses, as a standard, the current detection value Dcs0 at time $t_3$ to acquire the information (correction coefficient $\alpha 2_L$) for correcting the current detection value $Dcs2_L$ based on the voltage drop $Q_{V-L}$ of the V-phase lower arm $Q_{V-L}$.

At time $t_4$ where the V-phase current (second current) is 0, the W-phase current (third current) is positive, and the U-phase current (first current) is negative. In this case, the same amount of current flows through the W-phase higher arm $Q_{W-H}$, the U-phase lower arm $Q_{U-L}$, and the external resistance (shunt resistance) Rs0.

The calibration processing unit 246 uses, as a standard, the current detection value Dcs0 at time $t_4$ to acquire the information (correction coefficient $\alpha 3_H$) for correcting the current detection value $Dcs3_H$ based on the voltage drop $Q_{W-H}$ of the W-phase higher arm $Q_{W-H}$.

The calibration processing unit 246 uses, as a standard, the current detection value Dcs0 at time $t_4$ to acquire the information (correction coefficient $\alpha 1_L$) for correcting the current detection value $Dcs1_L$ based on the voltage drop $Q_{U-L}$ of the U-phase lower arm $Q_{U-L}$.

At time $t_5$ where the W-phase current (third current) is 0, the V-phase current (second current) is positive, and the U-phase current (first current) is negative. In this case, the same amount of current flows through the V-phase higher arm $Q_{V-H}$, the U-phase lower arm $Q_{U-L}$, and the external resistance (shunt resistance) Rs0.

The calibration processing unit 246 uses, as a standard, the current detection value Dcs0 at time $t_5$ to acquire the information (correction coefficient $\alpha 2_H$) for correcting the current detection value $Dcs2_H$ based on the voltage drop $Q_{V-H}$ of the V-phase higher arm $Q_{V-H}$.

The calibration processing unit 246 uses, as a standard, the current detection value Dcs0 at time $t_5$ to acquire the information (correction coefficient $\alpha 1_L$) for correcting the current detection value $Dcs1_L$ based on the voltage drop $Q_{U-L}$ of the U-phase lower arm $Q_{U-L}$.

One cycle of electrical angle (0° to 360°) has two current zero cross points at which the current detection values $Dcs1_H$, $Dcs1_L$, $Dcs2_H$, $Dcs2_L$, $Dcs3_H$, and $Dcs3_L$ can be calibrated. The current detection circuit 240 may acquire the correction coefficients at both of the two current zero cross points or may acquire the correction coefficients at only one of the points.

In the control circuit 300D of FIG. 12, PWM control is applied to the three-phase inverter 230.

(One-Phase Regeneration)

The current flows through the U-phase lower arm QU-L in the opposite direction when, for example, the U-phase output is low (that is, the lower arm is on) in the period (60° to 120° in FIG. 10) in which the U-phase is in the current source phase and the V-phase and the W-phase are in the current sink phase. The influence of the body diode cannot be ignored, and the accuracy of the current detection based on the on-resistance of the U-phase lower arm $Q_{U-L}$ is reduced.

Therefore, in the period in which only the U-phase is in the current source phase and the lower arm $Q_{U-L}$ is on, the current detection values $Dcs2_L'$ and $Dcs3_L'$ of the remaining two phases (V-phase and W-phase) may be added to generate the current detection value of the U-phase.

$$Dcs\ 1=-(Dcs\ 2_L'+Dcs\ 3_L')$$

Similarly, in the period in which only the V-phase is in the current source phase and the lower arm $Q_{V-L}$ is on, the current detection values $Dcs1_L'$ and $Dcs3_L'$ of the remaining two phases (U-phase and W-phase) may be added to generate the current detection value of the V-phase.

$$Dcs\ 2=-(Dcs\ 1_L'+Dcs\ 3_L')$$

Similarly, in the period in which only the W-phase is in the current source phase and the lower arm $Q_{W-L}$ is on, the current detection values $Dcs1_L'$ and $Dcs2_L'$ based on the voltage drops $V_{U-L}$ and $V_{V-L}$ of the lower arms $Q_{U-L}$ and $Q_{V-L}$ of the remaining two phases (U-phase and V-phase) may be added to generate the current detection value of the W-phase.

$$Dcs\ 3=-(Dcs\ 1_L'+Dcs\ 2_L')$$

(Two-Phase Regeneration)

The current flows through the U-phase lower arm $Q_{U-L}$ and the V-phase lower arm $Q_{V-L}$ in the opposite direction when, for example, the U-phase output and the W-phase output are low (that is, the lower arm is on) in the period (0° to 60° in FIG. 10) in which the U-phase and the V-phase are in the current source phase and the W-phase is in the current sink phase. The influence of the body diode cannot be ignored, and the accuracy of the current detection based on the on-resistance of the U-phase lower arm $Q_{U-L}$ and the V-phase lower arm $Q_{V-L}$ is reduced.

Therefore, in the period in which only two phases (U-phase and V-phase) are in the current source phase and the lower arms $Q_{U-L}$ and $Q_{V-L}$ are on, the current detection value $Dcs3_L'$ based on the voltage drop $V_{W-L}$ of the lower arm $Q_{W-L}$ of the remaining one phase (W-phase) may be distributed to generate the current detection values of the U-phase and the V-phase.

$$Dcs\ 1=Dcs\ 3_L' \times X$$

$$Dcs\ 2=Dcs\ 3_L' \times (1-X)$$

The distribution ratio X:1-X can be the ratio of the current detection values $Dcs1_H$ and $Dcs2_H$ most recently obtained when the higher arm is on (high output) in two phases (U-phase and V-phase) that are in the current source phase.

Although the current detection values based on the series resistance components of the wires or the current detection values based on the voltage drops of the higher arms and the lower arms of the three-phase inverter 230 are calibrated based on the voltage drop Vcs0 of the external resistance Rs0 in the embodiment, the method is not limited to this. A magnetic-detection current sensor may be provided in place of the external resistance Rs0, and the current detection values Dcs1 to Dcs3 may be calibrated based on the output of the current sensor. That is, in the description and the circuit diagrams, the external resistance Rs0 can be replaced with the magnetic-detection current sensor, and the voltage drop Vcs0 can be replaced with the output of the current sensor.

The embodiments described by using specific terms just illustrate principles and applications of the present disclosure, and many modifications and changes in arrangement can be made in the embodiments without departing from the scope of the present disclosure defined in the claims.

What is claimed is:

1. A control circuit of a three-phase direct current motor used along with an external resistance and a three-phase inverter, the control circuit comprising:
   a current detection circuit that generates a first current detection value indicating an amount of current of a first current flowing through a first phase of the three-phase inverter, wherein
   the external resistance is an external part provided on a path where the first current is able to flow, and
   the current detection circuit
      is able to generate the first current detection value on a basis of a voltage drop of a resistance component of a first wire existing on the path of the first current, the first wire being formed from a material containing copper, or on a basis of a voltage drop of a first resistance that is an on-resistance of an arm of the first phase of the three-phase inverter, and
      is able to use, as a standard, a specific current detection value based on a voltage drop of the external resistance to calibrate the first current detection value, wherein the calibration of the first current detection value is based on a relation between the specific current detection value based on the voltage drop of the external resistance and one of the voltage drop of the resistance component of the first wire or the voltage drop of the first resistance.

2. The control circuit according to claim 1, wherein the current detection circuit
is able to generate a second current detection value on a basis of a voltage drop of a resistance component of a second wire existing on a path of a second current flowing through a second phase of the three-phase inverter, the second wire being formed from a material containing copper, or on a basis of a voltage drop of a second resistance that is an on-resistance of an arm of the second phase, and
is able to generate a third current detection value on a basis of a voltage drop of a resistance component of a third wire existing on a path of a third current flowing through a third phase of the three-phase inverter, the third wire being formed from a material containing copper, or on a basis of a voltage drop of a third resistance that is an on-resistance of an arm of the third phase.

3. The control circuit according to claim 2, wherein
the first resistance is an on-resistance of each of a higher arm and a lower arm of the first phase of the three-phase inverter,
the second resistance is an on-resistance of each of a higher arm and a lower arm of the second phase of the three-phase inverter,
the third resistance is an on-resistance of each of a higher arm and a lower arm of the third phase of the three-phase inverter, and
the external resistance is inserted between the three-phase inverter and a ground.

4. The control circuit according to claim 3, wherein the current detection circuit
uses, as a standard, the current detection value based on the voltage drop of the external resistance to calibrate the first current detection value based on a voltage drop of the lower arm of the first phase in a period in which only the first phase is in a current sink phase,
uses, as a standard, the current detection value based on the voltage drop of the external resistance to calibrate the second current detection value based on a voltage drop of the lower arm of the second phase in a period in which only the second phase is in the current sink phase,
uses, as a standard, the current detection value based on the voltage drop of the external resistance to calibrate the third current detection value based on a voltage drop of the lower arm of the third phase in a period in which only the third phase is in the current sink phase,
uses, as a standard, the current detection value based on the voltage drop of the external resistance to calibrate the first current detection value based on a voltage drop of the higher arm of the first phase in a period in which only the first phase is in a current source phase,
uses, as a standard, the current detection value based on the voltage drop of the external resistance to calibrate the second current detection value based on a voltage drop of the higher arm of the second phase in a period in which only the second phase is in the current source phase, and
uses, as a standard, the current detection value based on the voltage drop of the external resistance to calibrate the third current detection value based on a voltage drop of the higher arm of the third phase in a period in which only the third phase is in the current source phase.

5. The control circuit according to claim 2, wherein
the first resistance is a resistance component of a fourth wire provided between a first phase output of the three-phase inverter and the three-phase direct current motor, the fourth wire being formed from a material containing copper,
the second resistance is a resistance component of a fifth wire provided between a second phase output of the three-phase inverter and the three-phase direct current motor, the fifth wire being formed from a material containing copper,
the third resistance is a resistance component of a sixth wire provided between a third phase output of the three-phase inverter and the three-phase direct current motor, the sixth wire being formed from a material containing copper,
the external resistance is inserted between the first phase output of the three-phase inverter and the three-phase direct current motor, in series with the first resistance, and
the current detection circuit calibrates the second current detection value and the third current detection value on a basis of a relation between the specific current detection value based on the voltage drop of the external resistance and the voltage drop of the first resistance.

6. The control circuit according to claim 2, wherein
the first resistance is a resistance component of a fourth wire provided between a first phase output of the three-phase inverter and the three-phase direct current motor, the fourth wire being formed from a material containing copper,
the second resistance is a resistance component of a fifth wire provided between a second phase output of the three-phase inverter and the three-phase direct current motor, the fifth wire being formed from a material containing copper,
the third resistance is a resistance component of a sixth wire provided between a third phase output of the three-phase inverter and the three-phase direct current motor, the sixth wire being formed from a material containing copper,
the external resistance is inserted between the first phase output of the three-phase inverter and the three-phase direct current motor, in series with the first resistance, and
the current detection circuit
calibrates the third current detection value on a basis of a relation between the specific current detection value based on the voltage drop of the external resistance and the voltage drop of the third resistance, when the second current is zero, and
calibrates the second current detection value on a basis of a relation between the specific current detection value based on the voltage drop of the external resistance and the voltage drop of the second resistance, when the third current is zero.

7. The control circuit according to claim 1, wherein
the first resistance is a resistance component of a fourth wire provided between a first phase output of the three-phase inverter and the three-phase direct current motor, the fourth wire being formed from a material containing copper, the external resistance is inserted between a second phase output of the three-phase inverter and the three-phase direct current motor, and the current detection circuit calibrates the first current detection value on a basis of the relation between the specific current detection value based on the voltage drop of the external resistance and the voltage drop of the first resistance, when a third current flowing through a third phase output is zero.

8. The control circuit according to claim 7, wherein the current detection circuit acquires, as a second current detection value indicating a second current flowing through the second phase output, the specific current detection value based on the voltage drop of the external resistance, and acquires a third current detection value indicating the third current, on a basis of a composite value of the first current detection value and the second current detection value.

9. The control circuit according to claim 2, wherein the first resistance is a resistance component of a fourth wire provided between a first phase output of the three-phase inverter and the three-phase direct current motor, the fourth wire being formed from a material containing copper, the second resistance is a resistance component of a fifth wire provided between a second phase output of the three-phase inverter and the three-phase direct current motor, the fifth wire being formed from a material containing copper, the third resistance is a resistance component of a sixth wire provided between a third phase output of the three-phase inverter and the three-phase direct current motor, the sixth wire being formed from a material containing copper, and the external resistance is inserted between the three-phase inverter and a ground.

10. The control circuit according to claim 9, wherein the current detection circuit calibrates the first current detection value in a period in which only the first phase output of the three-phase inverter is in a current sink phase.

11. The control circuit according to claim 9, wherein the current detection circuit is able to generate the second current detection value on a basis of a voltage drop of the second resistance that is the resistance component of the fifth wire provided between the second phase output of the three-phase inverter and the three-phase direct current motor, the fifth wire being formed from a material containing copper, and is able to generate the third current detection value on a basis of a voltage drop of the third resistance that is the resistance component of the sixth wire provided between the third phase output of the three-phase inverter and the three-phase direct current motor, the sixth wire being formed from a material containing copper.

12. The control circuit according to claim 11, wherein the current detection circuit calibrates the first current detection value in a period in which on the first phase output of the three-phase inverter is in a current sink phase, calibrates the second current detection value in a period in which on the second phase output of the three-phase inverter is in the current sink phase, and calibrates the third current detection value in a period in which only the third phase output of the three-phase inverter is in the current sink phase.

13. The control circuit according to claim 1, further comprising:

a magnetic-detection current sensor in place of the external resistance, wherein the current detection circuit is able to use, as a standard, a current detection value based on an output of the magnetic-detection current sensor to calibrate the first current detection value based on the voltage drop of the first resistance.

14. The control circuit according to claim 1, wherein the control circuit is integrated with one semiconductor substrate.

* * * * *